(12) United States Patent  (10) Patent No.: US 8,632,928 B2
Wallace et al.  (45) Date of Patent: Jan. 21, 2014

(54) WATER REACTIVE HYDROGEN FUEL CELL POWER SYSTEM

(75) Inventors: Andrew P. Wallace, Davis, CA (US);
John M. Melack, Winters, CA (US);
Michael Lefenfeld, New York, NY (US)

(73) Assignee: Signa Chemistry, Inc., New York, NY (US)

( * ) Notice: Subject to any disclaimer, the term of this patent is extended or adjusted under 35 U.S.C. 154(b) by 142 days.

(21) Appl. No.: 13/291,815

(22) Filed: Nov. 8, 2011

(65) Prior Publication Data

US 2012/0115054 A1  May 10, 2012

Related U.S. Application Data

(60) Provisional application No. 61/411,244, filed on Nov. 8, 2010.

(51) Int. Cl.
*H01M 8/06* (2006.01)
*H01M 8/02* (2006.01)

(52) U.S. Cl.
USPC .......................................................... 429/515

(58) Field of Classification Search
USPC .......................................................... 429/515
See application file for complete search history.

(56) References Cited

U.S. PATENT DOCUMENTS

| | | | |
|---|---|---|---|
| 1,665,264 A | 4/1928 | Holmes et al. | |
| 1,939,647 A | 12/1933 | Arnold et al. | |
| 1,997,340 A | 4/1935 | Osborg | |
| 2,378,290 A | 6/1945 | Drake et al. | |
| 2,731,326 A | 1/1956 | Alexander et al. | |
| 2,765,242 A | 10/1956 | Alexander et al. | |
| 3,033,800 A | 5/1962 | Elliott, Jr. et al. | |
| 3,033,801 A | 5/1962 | Kloepfer et al. | |
| 3,079,234 A | 2/1963 | Jenkins et al. | |
| 3,165,379 A | 1/1965 | Schwartz et al. | |
| 3,274,277 A | 9/1966 | Bloch et al. | |

(Continued)

FOREIGN PATENT DOCUMENTS

CN  101031507 A  9/2007
EP  1 845 572 A1  10/2007

(Continued)

OTHER PUBLICATIONS

Cros, et al., "Sur deux nouvelles phases du systeme silicium-sodium [Two new Phases of the Silicon-Sodium System], " C.D. Acad. Sc. Paris 260: 4764-4767 (1965).

(Continued)

*Primary Examiner* — Gregg Cantelmo
(74) *Attorney, Agent, or Firm* — Lucas & Mercanti, LLP; Barry Evans, Esq.; Albert B. Chen, Esq.

(57) ABSTRACT

A water reactive hydrogen fueled power system includes devices and methods to combine reactant fuel materials and aqueous solutions to generate hydrogen. The generated hydrogen is converted in a fuel cell to provide electricity. The water reactive hydrogen fueled power system includes a fuel cell, a water feed tray, and a fuel cartridge to generate power for portable power electronics. The removable fuel cartridge is encompassed by the water feed tray and fuel cell. The water feed tray is refillable with water by a user. The water is then transferred from the water feed tray into the fuel cartridge to generate hydrogen for the fuel cell which then produces power for the user.

34 Claims, 31 Drawing Sheets

(56) References Cited

U.S. PATENT DOCUMENTS

| | | | |
|---|---|---|---|
| 3,322,495 A | 5/1967 | Magee | |
| 3,489,516 A | 1/1970 | Kummerle | |
| 3,493,341 A | 2/1970 | LePage et al. | |
| 3,507,810 A | 4/1970 | Sanborn et al. | |
| 3,527,563 A | 9/1970 | Shanklin | |
| 3,535,262 A | 10/1970 | Hubbuch et al. | |
| 3,575,885 A | 4/1971 | Hunter et al. | |
| 3,576,891 A | 4/1971 | Rosenthal | |
| 3,658,724 A | 4/1972 | Stiles | |
| 3,670,033 A | 6/1972 | Izawa et al. | |
| 3,679,605 A | 7/1972 | Sanford et al. | |
| 3,793,382 A | 2/1974 | Higuchi et al. | |
| 3,794,712 A | 2/1974 | Aboutboul et al. | |
| 3,801,705 A | 4/1974 | Krekeler et al. | |
| 3,878,289 A | 4/1975 | Beavon | |
| 3,915,995 A | 10/1975 | Holmes et al. | |
| 3,954,896 A | 5/1976 | Shima et al. | |
| 4,087,477 A | 5/1978 | Tazuma et al. | |
| 4,168,247 A | 9/1979 | Hayden et al. | |
| 4,248,741 A | 2/1981 | Wernli et al. | |
| 4,353,815 A | 10/1982 | Antos | |
| 4,366,091 A | 12/1982 | Antos | |
| 4,394,302 A | 7/1983 | Miller et al. | |
| 4,413,156 A | 11/1983 | Watts, Jr. et al. | |
| 4,435,606 A | 3/1984 | Motz et al. | |
| 4,440,631 A | 4/1984 | Togari et al. | |
| 4,446,251 A | 5/1984 | Bartley et al. | |
| 4,471,075 A | 9/1984 | Bartley et al. | |
| 4,508,930 A | 4/1985 | Wideman et al. | |
| 4,633,029 A | 12/1986 | Tillett, Jr. et al. | |
| 4,737,161 A | 4/1988 | Szydlowski et al. | |
| 4,769,501 A | 9/1988 | Iwahara | |
| 4,837,194 A | 6/1989 | Hayden | |
| 4,975,405 A | 12/1990 | Okamura et al. | |
| 4,982,044 A | 1/1991 | Smith | |
| 5,008,480 A | 4/1991 | Slaugh | |
| 5,128,291 A | 7/1992 | Wax et al. | |
| 5,292,985 A | 3/1994 | Lattner et al. | |
| 5,372,617 A | 12/1994 | Kerrebrock et al. | |
| 5,593,640 A | 1/1997 | Long et al. | |
| 5,741,999 A | 4/1998 | Kazumi et al. | |
| 5,856,262 A | 1/1999 | Flick et al. | |
| 6,022,823 A | 2/2000 | Augustine et al. | |
| 6,096,934 A | 8/2000 | Rekoske | |
| 6,103,403 A | 8/2000 | Grigorian et al. | |
| 6,191,059 B1 | 2/2001 | Varanasi | |
| 6,309,620 B1 | 10/2001 | Schlegel et al. | |
| 6,358,488 B1 | 3/2002 | Suda | |
| 6,399,528 B1 | 6/2002 | Krell et al. | |
| 6,403,852 B1 | 6/2002 | Yamamoto et al. | |
| 6,423,286 B1 | 7/2002 | Gryko | |
| 6,492,014 B1 | 12/2002 | Rolison et al. | |
| 6,497,973 B1 | 12/2002 | Amendola | |
| 6,534,033 B1 | 3/2003 | Amendola et al. | |
| 6,544,400 B2 | 4/2003 | Hockaday et al. | |
| 6,548,711 B2 | 4/2003 | Yamamoto et al. | |
| 6,586,636 B2 | 7/2003 | Kelly | |
| 6,706,928 B2 | 3/2004 | Kelly | |
| 6,745,801 B1 | 6/2004 | Cohen et al. | |
| 6,746,496 B1* | 6/2004 | Kravitz et al. | 48/118.5 |
| 6,818,334 B2 | 11/2004 | Tsang | |
| 6,821,499 B2 | 11/2004 | Jorgensen | |
| 6,901,302 B2 | 5/2005 | Kami | |
| 6,904,533 B2 | 6/2005 | Kuo et al. | |
| 6,932,847 B2 | 8/2005 | Amendola et al. | |
| 6,939,529 B2 | 9/2005 | Strizki et al. | |
| 7,052,671 B2 | 5/2006 | McClaine et al. | |
| 7,074,509 B2 | 7/2006 | Rosenfeld et al. | |
| 7,083,657 B2 | 8/2006 | Mohring et al. | |
| 7,105,033 B2 | 9/2006 | Strizki et al. | |
| 7,115,244 B2 | 10/2006 | Zhao et al. | |
| 7,169,489 B2* | 1/2007 | Redmond | 429/515 |
| 7,211,539 B2 | 5/2007 | Lefenfeld et al. | |
| 7,271,567 B2 | 9/2007 | Dunn et al. | |
| 7,393,369 B2 | 7/2008 | Shurtleff | |
| 7,410,567 B2 | 8/2008 | Lefenfeld et al. | |
| 7,438,732 B2 | 10/2008 | Shurtleff et al. | |
| 7,455,829 B2 | 11/2008 | Eickhoff et al. | |
| 7,501,008 B2 | 3/2009 | Eshraghi et al. | |
| 7,604,719 B2 | 10/2009 | Vanden Bussche et al. | |
| 7,624,801 B2 | 12/2009 | Zubrin et al. | |
| 7,648,786 B2 | 1/2010 | Shurtleff et al. | |
| 7,666,386 B2* | 2/2010 | Withers-Kirby et al. | 423/650 |
| 7,670,698 B2 | 3/2010 | Eickhoff et al. | |
| 7,727,293 B2* | 6/2010 | Rosenzweig et al. | 48/61 |
| 7,811,541 B2 | 10/2010 | Lefenfeld et al. | |
| 8,057,939 B2 | 11/2011 | Eickhoff et al. | |
| 8,372,371 B2 | 2/2013 | Lefenfeld et al. | |
| 2002/0090539 A1 | 7/2002 | Getty et al. | |
| 2007/0039815 A1 | 2/2007 | Bartel | |
| 2007/0167317 A1* | 7/2007 | Lefenfeld et al. | 502/237 |
| 2010/0247426 A1* | 9/2010 | Wallace et al. | 423/648.1 |
| 2011/0311895 A1 | 12/2011 | Spare et al. | |
| 2011/0313589 A1 | 12/2011 | Iyer et al. | |

FOREIGN PATENT DOCUMENTS

| | | |
|---|---|---|
| WO | WO 00/17104 | 3/2000 |
| WO | WO 2005/051839 | 6/2005 |
| WO | WO 2005/123586 | 12/2005 |
| WO | WO 2006/135896 | 12/2006 |
| WO | WO 2007/024803 | 3/2007 |
| WO | WO 2007/140158 | 12/2007 |
| WO | WO 2010/114849 A1 | 10/2010 |

OTHER PUBLICATIONS

Gryko et al., "NMR Studies of Na Atoms in silicon clathrate compounds," Phys. Rev. B 54(5);3037-3039 (1996).

He et al., "NMR and X Ray Spectroscopy of Sodium-Silicon Clathrates," J. Phys. Chem. B. 105:3475-3485 (2001).

Kishi et al., "Geometric and electronic structure of silicon-sodium binary clusters. I. Ionization energy of Si n Na m" J. Chem Phys. 107(8): 3056-3070 (1997).

Ma et al., "A versatile low temperature synthetic route to Zinti phase precursors: Na4 Si4, Na4 Ge4 and K4 Ge4 as examples." Dalton Transactions, pp. 1-6, The Royal Society of Chemistry (2009).

Mayeri et al., "NMR Study of the Synthesis of Alkyl-Terminated Silicon Nanoparticles from the Reaction of SiCl4 with the Zinti Salt, NaSi" Chem. Mater 13:765-770 (2001).

Novotny et al., "Uber eine ternare Verbindung im System Aluminium-Silizium-Natrium [A Ternary Compound in the System Aluminum-Silicon-Sodium]", Metallforsch. 2:76-80 (1947).

Savin et al., "Pseudopotential Calculations on Alkali Silicide Clusters with Si2 and Tetrahedral Si4 Backbones," J. Am Chem. Soc. 110:373-375 (1988).

Witte et al., "Die Kristallstrucktur von NaSi and NaGe," Zeit Anorgen Allege Chemie 327:260-273 (1964).

Rayment et al., Introduction to Fuel Cell Technology, Department of Aerospace and Mechanical Engineering, University of Notre Dame, Notre Dame, IN 46556, May 2, 2003.

International Search Report from PCT/US2005/20766, dated May 2, 2006.

International Search Report from PCT/US2010/029257, Jun. 1, 2010.

International Preliminary Report on Patentability of International Application No. PCT/US2010/029257; dated Oct. 13, 2011.

Supplementary European Search Report and European Search Opinion for EP Application No. 10759306, mailed Oct. 17, 2012.

International Search Report from PCT/US04/39304, dated Jan. 6, 2006.

Partial European Search Report for EP 12187231.1, dated Dec. 18, 2012.

Supplementary European Search Report for EP 05785526.4, dated Dec. 18, 2009.

* cited by examiner

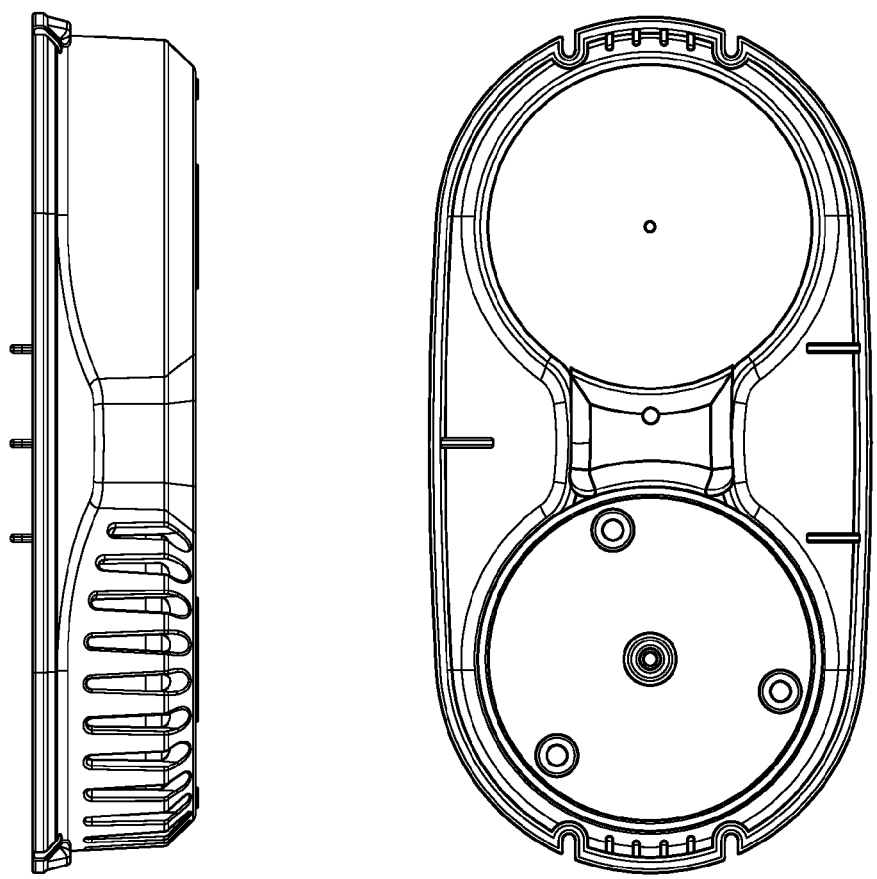
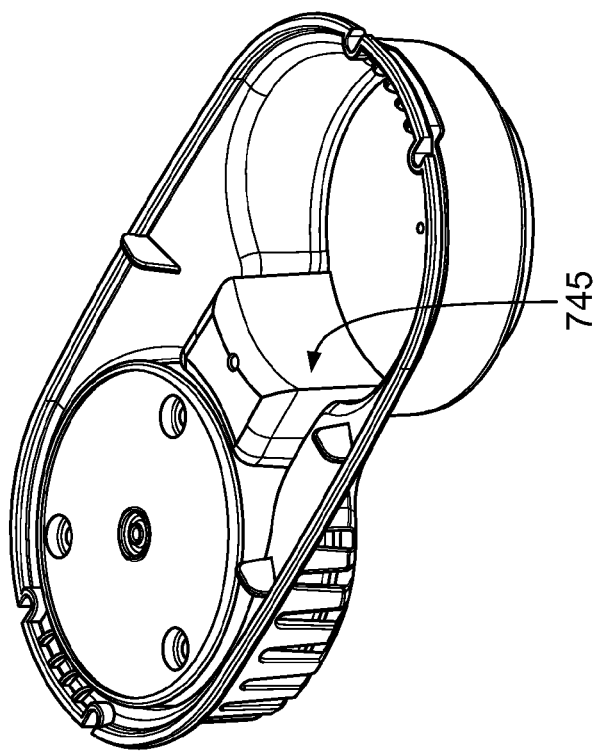
FIG. 7

SECTION A-A

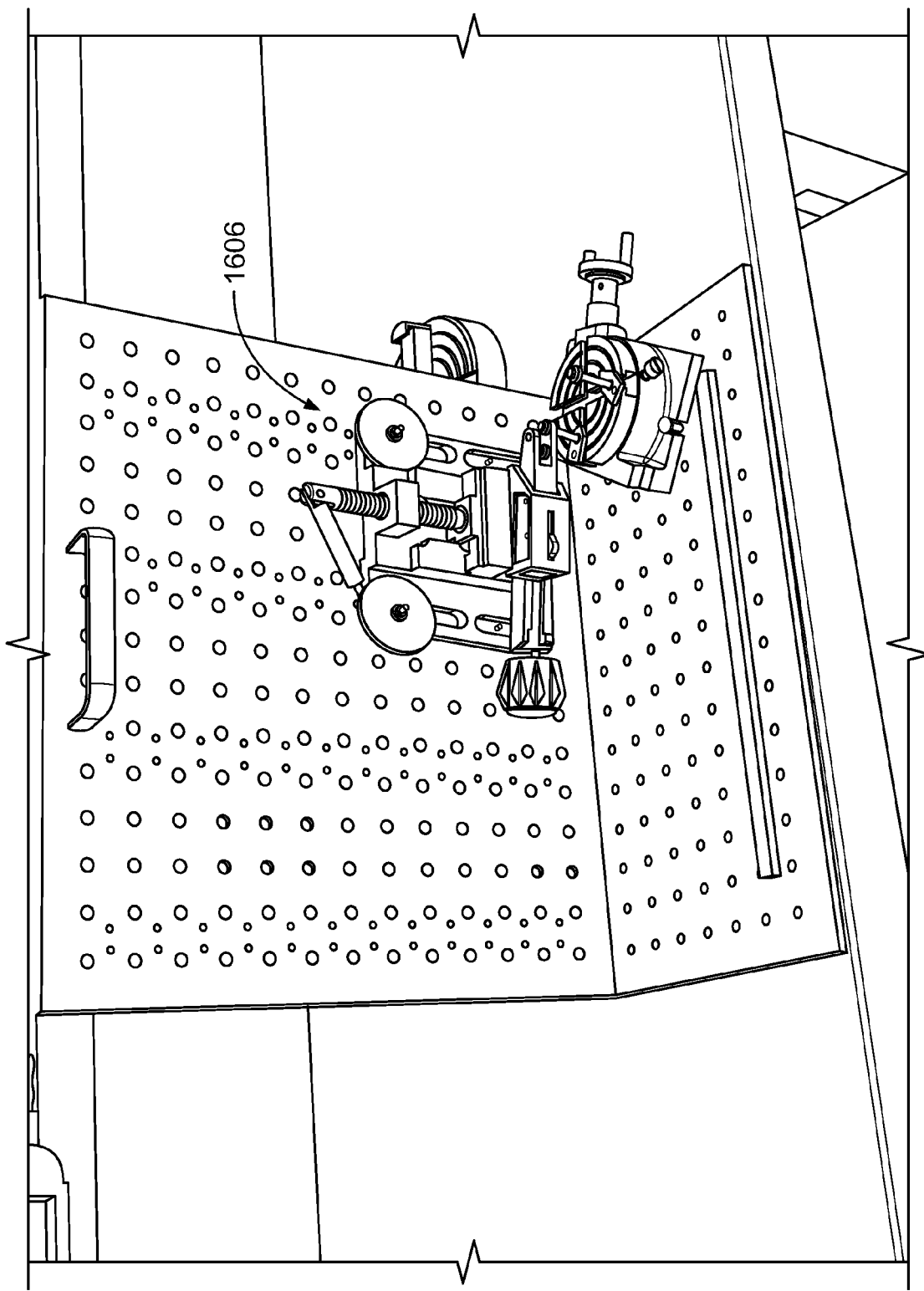

DETAIL C

A-A

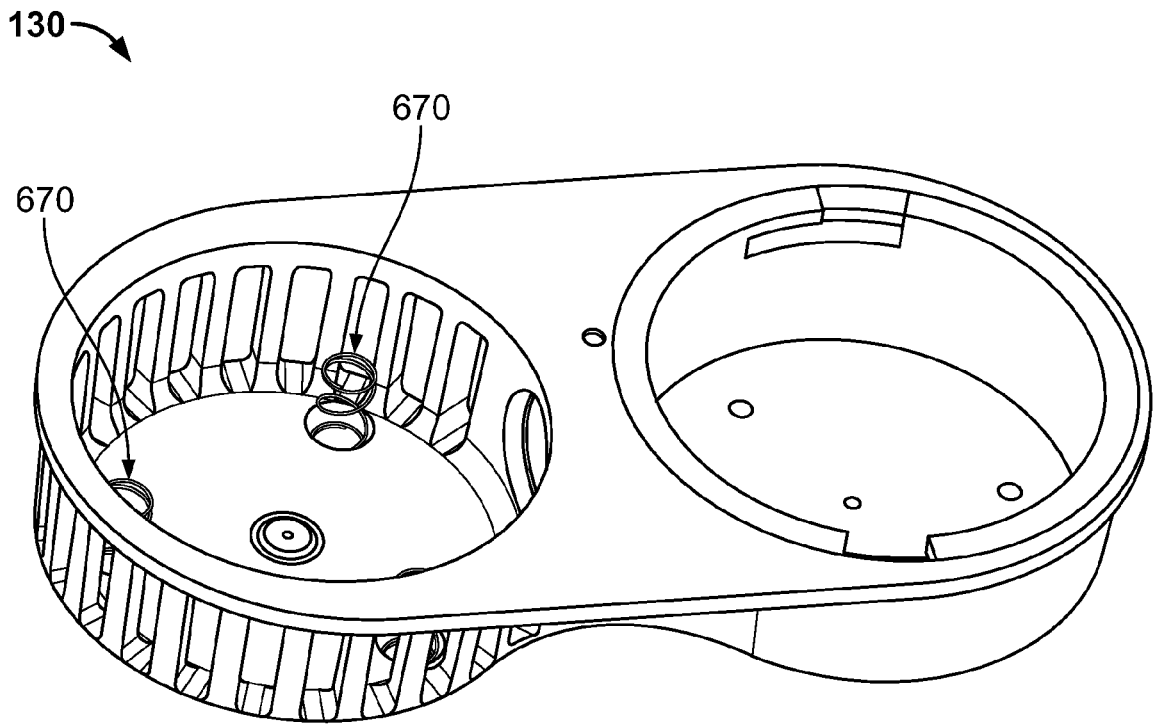
FIG. 20
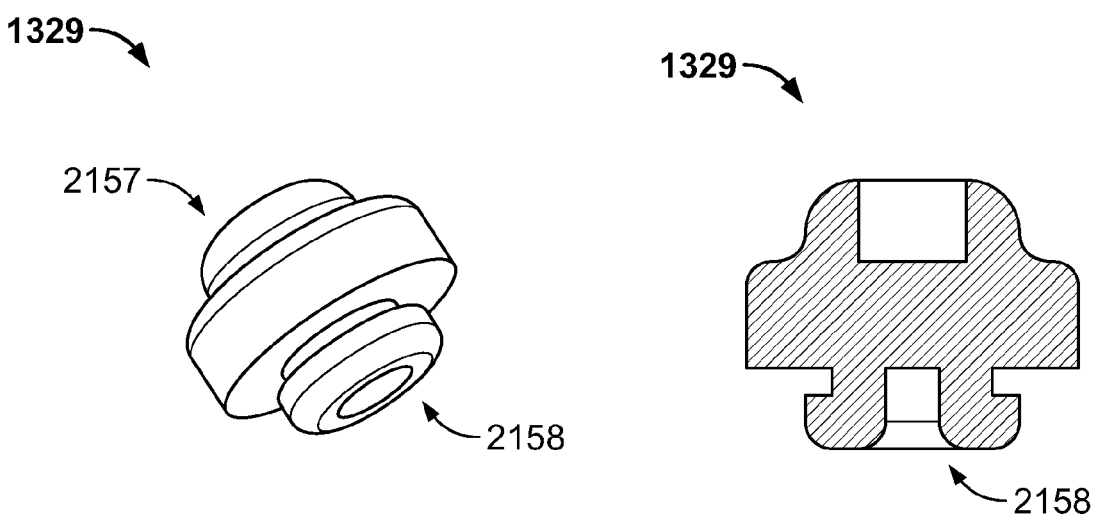
FIG. 21A  FIG. 21B

WATER REACTIVE HYDROGEN FUEL CELL POWER SYSTEM

CROSS-REFERENCE TO RELATED APPLICATION

This application claims benefit of priority of U.S. Provisional Patent Application Ser. No. 61/411,244 filed on Nov. 8, 2010 and is related to U.S. patent application Ser. No. 12/750,527 filed on Mar. 30, 2010, the entire disclosures of which are incorporated herein by reference.

FEDERALLY-SPONSORED RESEARCH AND DEVELOPMENT

This invention was made with government support under contract number DE-FG36-08GO88108 awarded by the U.S. Department of Energy. The U.S. Government has certain rights in this invention.

TECHNOLOGICAL FIELD

This technology generally relates to of hydrogen-generating fuel cell systems and methods, and more particularly, to systems and methods for generating hydrogen using sodium suicide, sodium silica gel, or multi-component mixtures that are reacted with water or water solutions.

BACKGROUND

Fuel cells are electrochemical energy conversion devices that convert an external source fuel into electrical current. Many fuel cells use hydrogen as the fuel and oxygen (typically from air) as an oxidant. The by-product for such a fuel cell is water, making the fuel cell a very low environmental impact device for generating power.

Fuel cells compete with numerous other technologies for producing power, such as the gasoline turbine, the internal combustion engine, and the battery. A fuel cell provides a direct current (DC) voltage that can be used for numerous applications including stationary power generation, lighting, back-up power, consumer electronics, personal mobility devices, such as electric bicycles, as well as landscaping equipment, and other applications. There are a wide variety of fuel cells available, each using a different chemistry to generate power. Fuel cells are usually classified according to their operating temperature and the type of electrolyte system that they utilize. One common fuel cell is the polymer exchange membrane fuel cell (PEMFC), which uses hydrogen as the fuel with oxygen (usually air) as its oxidant. It has a high power density and a low operating temperature of usually below 80° C. These fuel cells are reliable with modest packaging and system implementation requirements.

The challenge of hydrogen storage and generation has limited the wide-scale adoption of PEM fuel cells. Although molecular hydrogen has a very high energy density on a mass basis, as a gas at ambient conditions it has very low energy density by volume. The techniques employed to provide hydrogen to portable applications are widespread, including high pressure and cryogenics, but they have most often focused on chemical compounds that reliably release hydrogen gas on-demand. Three broadly accepted mechanisms used to store hydrogen in materials are absorption, adsorption, and chemical reaction.

In absorptive hydrogen storage for fueling a fuel cell, hydrogen gas is absorbed directly at high pressure into the bulk of a specific crystalline material, such as a metal hydride. Metal hydrides such as $MgH_2$, $NaAlH_4$, and $LaNi_5H_6$, can be used to store the hydrogen gas reversibly. However, metal hydride systems often suffer from poor specific energy (i.e., a low hydrogen storage to metal hydride mass ratio) and poor input/output flow characteristics. The hydrogen flow characteristics are driven by the endothermic properties of metal hydrides (the internal temperature drops when removing hydrogen and rises when recharging with hydrogen). Because of these properties, metal hydrides tend to be heavy and require complicated systems to rapidly charge and/or discharge them. For example, see U.S. Pat. No. 7,271,567 for a system designed to store and then controllably release pressurized hydrogen gas from a cartridge containing a metal hydride or some other hydrogen-based chemical fuel. This system also monitors the level of remaining hydrogen capable of being delivered to the fuel cell by measuring the temperature and/or the pressure of the metal hydride fuel itself and/or by measuring the current output of the fuel cell to estimate the amount of hydrogen consumed.

In adsorption hydrogen storage for fueling a fuel cell, molecular hydrogen is associated with the chemical fuel by either physisorption chemisorption. Chemical hydrides, such as lithium hydride (LiH), lithium aluminum hydride (LiAlH4), borohydride (LiBH4), sodium hydride (NaH), sodium borohydride (NaBH4), and the like, are used to store hydrogen gas non-reversibly. Chemical hydrides produce large amounts of hydrogen gas upon reaction with water as shown below:

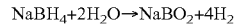

$$NaBH_4 + 2H_2O \rightarrow NaBO_2 + 4H_2$$

To reliably control the reaction of chemical hydrides with water to release hydrogen gas from a fuel storage device, a catalyst must be employed along with control of the water's pH. Additionally, the chemical hydride is often embodied in a slurry of inert stabilizing liquid to protect the hydride from early release of its hydrogen gas.

In chemical reaction methods for producing hydrogen for a fuel cell, ollen hydrogen storage and hydrogen release are catalyzed by a modest change in temperature or pressure of the chemical fuel. One example of this chemical system, which is catalyzed by temperature, is hydrogen generation from ammonia-borane by the following reaction:

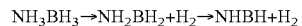

$$NH_3BH_3 \rightarrow NH_2BH_2 + H_2 \rightarrow NHBH + H_2$$

The first reaction releases 61 wt. % hydrogen and occurs at approximately 120° C., while the second reaction releases another 6.5 wt. % hydrogen and occurs at approximately 160° C. These chemical reaction methods do not use water as an initiator to produce hydrogen gas, do not require a tight control of the system pH, and often do not require a separate catalyst material. However, these chemical reaction methods are plagued with system control issues often due to the common occurrence of thermal runaway. See, for example, U.S. Pat. No. 7,682,411, for a system designed to thermally initialize hydrogen generation from ammonia-borane and to protect from thermal runaway. See, for example, U.S. Pat. Nos. 7,316,788 and 7,578,992, for chemical reaction methods that employ a catalyst and a solvent to change the thermal hydrogen release conditions.

In view of the above, there is a need for an improved hydrogen generation system and method that overcomes problems or disadvantages in the prior art.

SUMMARY

The hydrogen fuel cell power system described below includes three primary subsystems, including a fuel cell, a water feed tray system, and a fuel cartridge. This system is designed for the class of fuel cell systems called "water-reactive." In a water-reactive system, water (or a liquid solution) is combined with a powder to generate hydrogen for a fuel cell system. These reaction types can use a range of powders such as sodium silicide, sodium silica gel, sodium borohydride, sodium silicide/sodium borohydride mixtures, aluminum, and others. Activators, catalysts, or additives can be added to the powder to control water dispersion through the powder or water absorption of the reaction by-products. Additives to the powder can also include defoamers, such as oils, as well as similar materials to distribute local reaction sites and/or temperatures to result in a more uniform reactivity and heat distribution in the fuel cartridge and to control reaction conditions, including, for example, the chemical and physical nature of the reaction products and by-products. Powder size can be controlled to facilitate water transport, reaction rate, and byproduct water absorption. Activators, catalysts, or other additives can also be added to the water in order to form a liquid solution at varying conditions.

The reactant fuel material can include stabilized alkali metal materials such as silicides, including sodium silicide powder (NaSi), and sodium-silica gel (Na-SG). The stabilized alkali metal materials can also be combined with other reactive materials, including, but not limited to, ammonia-borane (with or without catalysts), sodium borohydride (mixed with or without catalysts), and an array of materials and material mixtures that produce hydrogen when exposed to heat or aqueous solutions. The mixture of materials and the aqueous solutions can also include additives to control the pH of the waste products, to change the solubility of the waste products, to increase the amount of hydrogen production, to increase the rate of hydrogen production, and to control the temperature of the reaction. The aqueous solution can include water, acids, bases, alcohols, and mixtures of these solutions. Other examples of the aqueous solutions can include methanol, ethanol, hydrochloric acid, acetic acid, sodium hydroxide, and the like. The aqueous solutions can also include additives, such as a coreactant that increases the amount of produced, a flocculant, a corrosion inhibitor, or a thermo-physical additive that changes thermophysical properties of the aqueous solution. Example flocculants include calcium hydroxide, sodium silicate, and others, while corrosion inhibitors can include phosphates, borates, and others. Further, the thermophysical additive can change the temperature range of reaction, the pressure range of the reaction, and the like. Further, the additive to the aqueous solution can include mixtures of a variety of different additives.

The claimed invention can include a removable/replaceable fuel cartridge that is inserted into a water feed tray system. A fuel cell can be connected to the water feed tray system encompassing the fuel cartridge. In the process of this connection, the fuel cartridge forms a water connection with the water feed tray and a hydrogen gas connection with the fuel cell. The water feed tray can be designed to store and be re-filled with water. The water feed tray system can be designed not to output water until the water feed tray is connected to a fuel cartridge. As water enters the fuel cartridge from the water feed tray, hydrogen is generated and delivered to the fuel cell. Upon disconnection of the water feed tray and fuel cell, a valve in the water tray closes, which in turn stops water flow in the water tray. In addition, a spring mechanism in the water feed tray ejects the fuel cartridge from the water feed tray which disconnects the water flow path to the fuel cartridge. Either or both of these configurations and techniques stop water flow and ceases production of hydrogen. In another example implementation, a mechanical flow valve or similar mechanism can be employed to stop water flow into the fuel cartridge while the fuel cartridge remains connected. This in turn, stops hydrogen from being generated. The flow valve can be a physical switch controlled by a user or an electronically controlled switch. Likewise, in another example implementation, the flow can be controlled by a pump to turn off water flow while the fuel cartridge is still engaged or to pump water if flow is desired.

In one example implementation, the water feed tray and fuel cell can be constructed to effectively function as a single sub-system with a replaceable fuel cartridge being a removable/replaceable component. In another implementation, the water feed tray and fuel cartridge can be constructed to effectively function as a single sub-system with the entire sub-system being removable/replaceable.

BRIEF DESCRIPTION OF THE DRAWINGS

FIG. 7 is a perspective view, side view, and top view of a water feed tray with a fuel cartridge inserted.

FIG. 16A shows a tool to crimp a metallic fuel cartridge body to a plastic fuel cartridge cap for use in a hydrogen fuel cell power system in accordance with the claimed invention.

FIG. 20 shows springs to "eject" cartridges from the tray of a hydrogen fuel cell power system in accordance with the claimed invention.

FIGS. 21A and 21B show a normally closed needle valve for use in a hydrogen fuel cell power system in accordance with the claimed invention in a perspective view and a cross sectional view, respectively.

DETAILED DESCRIPTION

Figure 1:
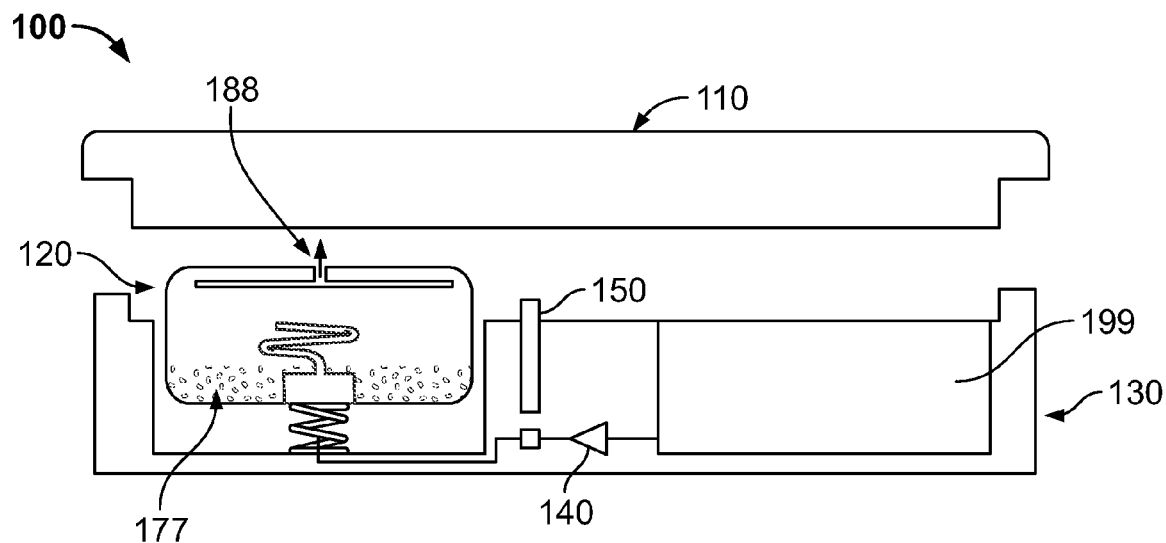
FIG. 1 shows a diagram of a hydrogen fuel cell power system, including a fuel cell, water feed tray, and a fuel cartridge in accordance with the claimed invention.

FIG. 1 shows one example of a water-reactive, hydrogen-fueled power system 100 in accordance with the claimed invention. The system 100 includes a filet cartridge 120, a water feed tray 130, and a fuel cell 110. Fuel cartridge 120 includes a reactant fuel material 177.

The reactant fuel material 177 can include stabilized alkali metal materials, including powders such as sodium silicide, sodium silica gel, sodium borohydride, sodium silicide/sodium borohydride mixtures, aluminum, and others. Activators, catalysts, and/or additives can be added to the reactant fuel material 177 to control water dispersion through the reactant fuel material 177 or water absorption of the reaction by-products. Additives to the reactant fuel material 177 can also include defoamers, such as oils, such as mineral oils, as well as other materials to distribute local reaction temperatures to result in a more uniform heat distribution in the fuel cartridge 120. The reactant fuel material 177 powder size can be controlled to facilitate water transport, reaction rate, and byproduct water absorption. For example, the powder size of the reactant fuel material 177 can be varied from less than 1 mm to 9 mm. In one example implementation, the powder size of the sodium silicide was from approximately 4 mm to 6 mm. This powder size is made large enough to eliminate problematic binding when water or another aqueous solution is added to the fuel cartridge. Instead of adding water to a too-fine powder that is susceptible to binding when wet, this reactant fuel configuration allows for the added water 199 to effectively reach fresh powder as the water 199 is added to the fuel cartridge 120.

The reactant fuel material 177 can also include stabilized alkali metal materials such as silicides, including sodium silicide powder (NaSi), and sodium-silica gel (Na-SG). The stabilized alkali metal materials can also be combined with other reactive materials, including, for example, ammonia-borane (with or without catalysts), sodium borohydride (mixed with or without catalysts), and an array of materials and material mixtures that produce hydrogen when exposed to heat or aqueous solutions. In one example implementation, the reactant fuel material 177 includes stabilized alkali metal materials and such optional coreactants.

The water feed tray 130 can be filled with water 199 by a user. Activators, catalysts, or other additives can also be added to the water 199 in order to form a liquid solution. The water feed tray 130 includes a mechanism (not shown separately in FIG. 1) to pressurize the water 199. The mechanism can be a bellows assembly, a spring assembly, a piston assembly, and the like, as discussed further with regard to FIGS. 2 and 8 below. For example, FIG. 8 shows an exploded view of a reservoir portion 832 of the water feed tray 130 that incorporates a spring assembly 834 that is fitted in the water feed tray 130 to pressurize the water 199. Spring assembly 834 can be an inverted spring where the inner coil is pulled through the outer coil during use. The inverted spring effectively increases the length of the spring assembly 834, and creates a more linear force range over the displacement range. This linear force can then be transferred to the water and/or to a bellows assembly holding the water. As the inverted spring provides force to pressurize the water, the inverted spring decreases in length, however even when the inverted spring reaches the state where it is flat, the spring is still in a stressed state (providing force). This allows the water to be under pressure even when almost all water (in the bellows or in the reservoir portion of the water tray) has been used. When unlocked, the spring assembly 834 imparts a force on the water by pulling on the bellows door assembly (for example, resulting in pressurized water of approximately 2-4 psi). The pressure is used to feed the water flow from water tray 130 to fuel cartridge 120 to begin the reaction. The spring assembly 834 can be a traditional coiled spring 872 or can be made of a stamped piece of metal that is elongated and heat treated such that when the spring assembly 834 is flat in the bellows assembly 260 it is still in a stressed state (remains under pressure). In this fashion, the spring mechanism is configured such that there is positive spring force that results in pressurized water even when almost all the water has been fed out of the bellows assembly 260.

The pressurized water 199 or liquid solution flows into the fuel cartridge 120 from the water feed tray 130 through a check valve 140 and poppet 150. Hydrogen 188 is generated inside the fuel cartridge 120 and flows into the fuel cell 110. A diagram showing the flow of water 199 pressurized by a bellows assembly 260 through a poppet 150 and check valve 140 into a fuel cartridge 120 is shown in further detail in FIG. 2. The water 199 shown in FIG. 2 enters a water chamber and bellows assembly 260. For simplicity water 199, both in and out of the bellows assembly is shown as reference numeral 199. When the water 199 reacts with the reactant fuel material 177 in the fuel cartridge 120, hydrogen 188 is produced and flows from the fuel cartridge 120 to the fuel cell (not shown separately in FIG. 2).

Figure 22:
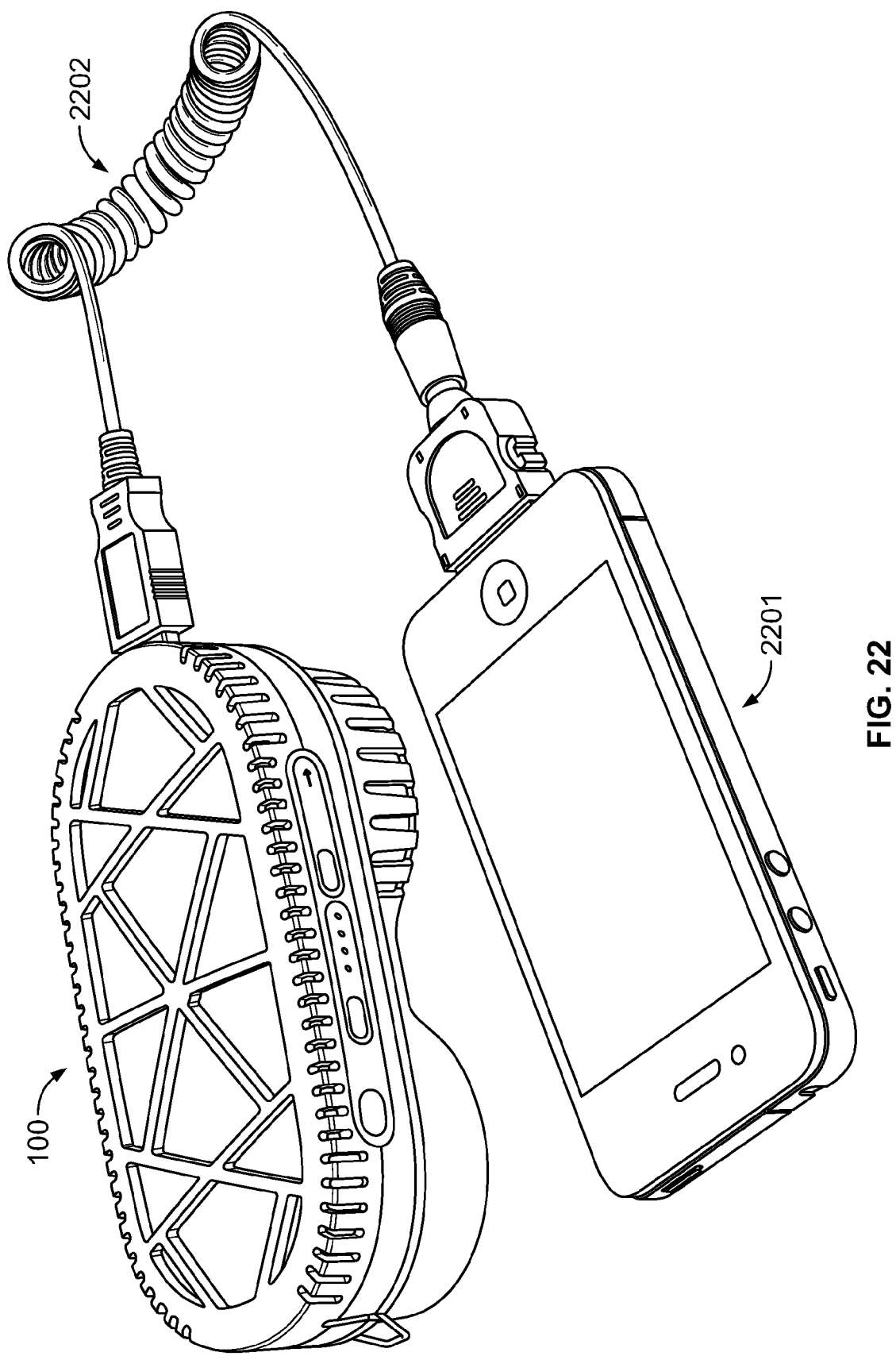
FIG. 22 shows a system in accordance with the claimed invention charging a cellular telephone.

Returning to FIG. 1, the fuel cell 110 utilizes the hydrogen 188 from the fuel cartridge 120 and oxygen from the air to create an electric potential. Once the electric potential is created, the system 100 can be used to charge and/or run electronic devices, such as a cellular telephone 2201 as shown in FIG. 22. Adapter cables 2202 can be fashioned to operably connect the system 100 to the electronic devices. Of course, other electronic devices may use the electric potential created by the system 100 to charge, or run, or operate. In this disclosure, the fuel cell 110 is considered to be a fuel cell system. For example, a fuel cell system can contain multiple fuel cells, a fuel cell stack, a battery, power electronics, control electronics, electrical output connectors (such as USB connectors), hydrogen input connectors, and air access locations to provide air for both cooling and for the reaction.

Figure 6A:
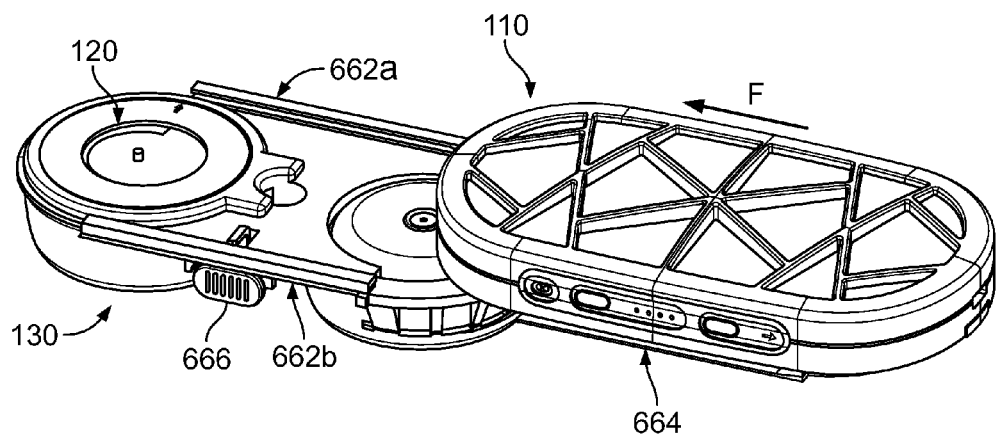
FIGS. 6A and 6B illustrate a sliding lock mechanism used in a hydrogen fuel cell power system in an open view and in a closed view in accordance with the claimed invention.
Figure 6B:
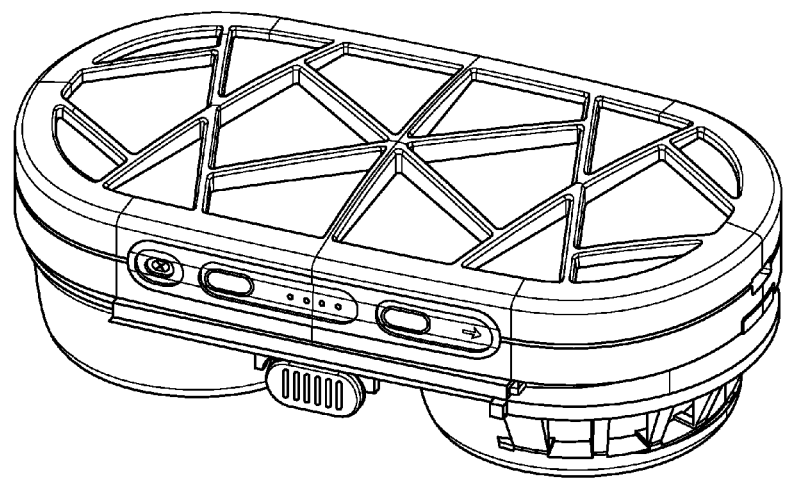

The fuel cell (system) 110 can be attached to the water feed tray 130 and/or fuel cartridge 120 using a number of different techniques. As shown in FIG. 6A, for example, the fuel cartridge 120 is inserted in water feed tray 130, which is then secured to fuel cell 110 using guide rails 662a, 662b on the water feed tray 130 and guide rail 664 on the fuel cell 110. As the fuel cell 110 is slid along direction arrow F onto the water feed tray 130, spring latch 666 is displaced until a calibrated notch (not shown separately) is engaged to securely prevent bi-directional sliding of the system 100. FIG. 6B shows the secured position of the system.

Figure 6C:
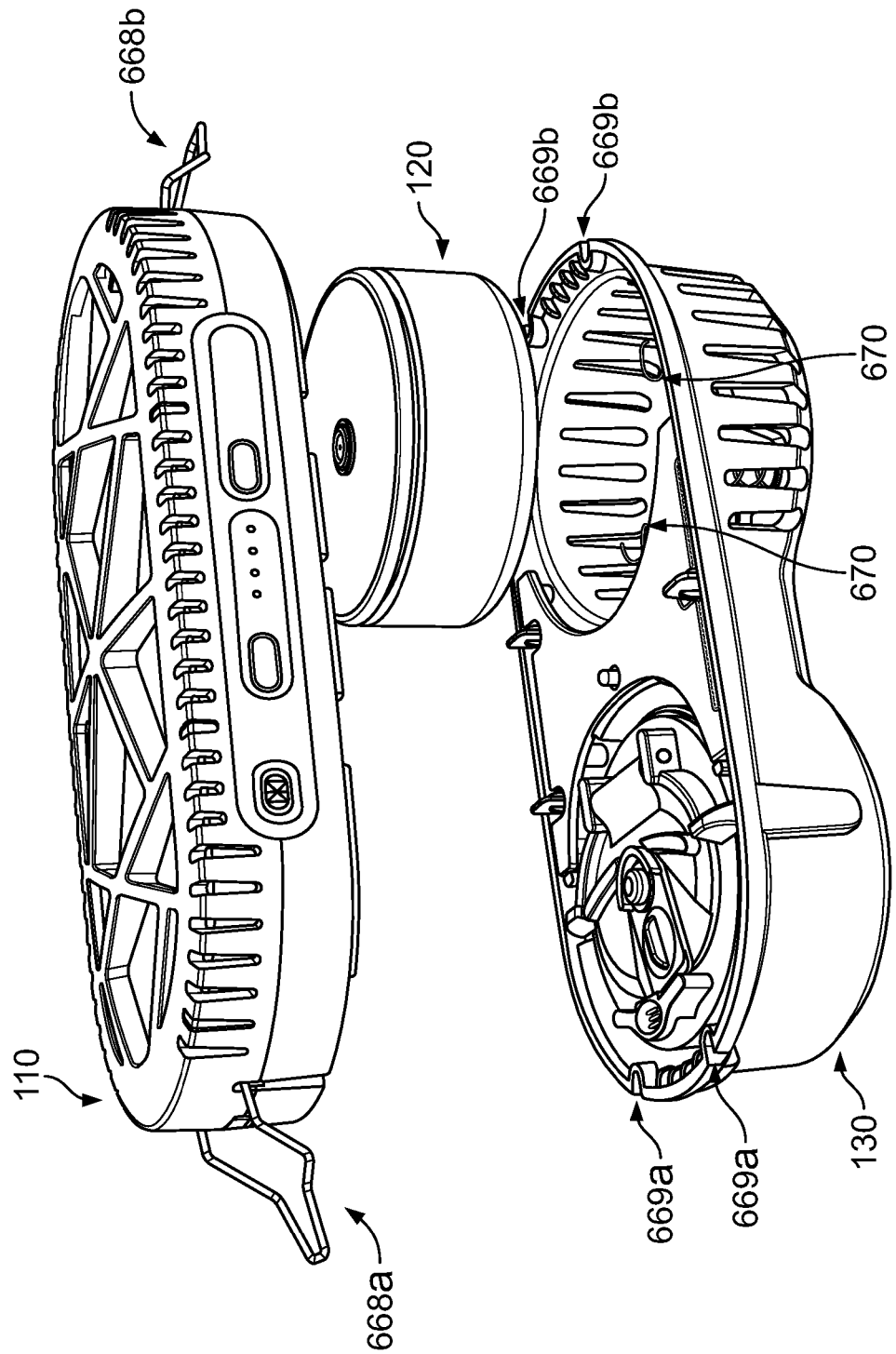
FIG. 6C illustrates water feed tray, fuel cartridge, and fuel cell sub-systems with a latch connection mechanism.
Figure 6D:
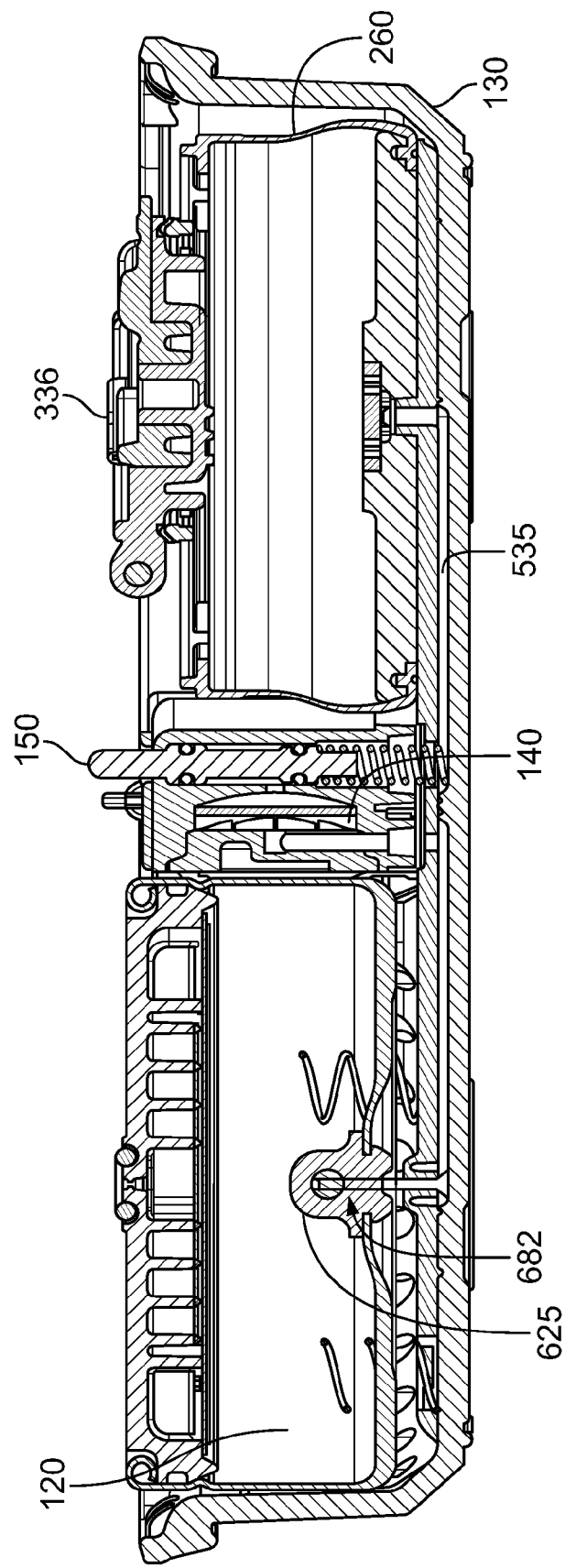
FIG. 6D is a cross-sectional view of a water feed tray and fuel cartridge in accordance with the claimed invention.

An alternative manner of mechanically securing the fuel cell 110 to the water feed tray 130 and fuel cartridge 120 is shown in FIG. 6C. In this example, the fuel cell 110 is not mechanically slid and locked to the fuel cartridge 120 and/or water feed tray 130, but rather, the fuel cartridge 120 is captured by the water feed tray 130 and fuel cell 110 using latches 668a, 668b. Latches 668a, 668b can be used to securely clamp the water feed tray 130 to the fuel cell 110 during hydrogen generation operations by using compressive force for engagement with latch locking points 669a, 669b on the water feed tray 130 to prevent the fuel cell 110, water feed tray 130, and fuel cartridge 120 from separating.

Figure 2:
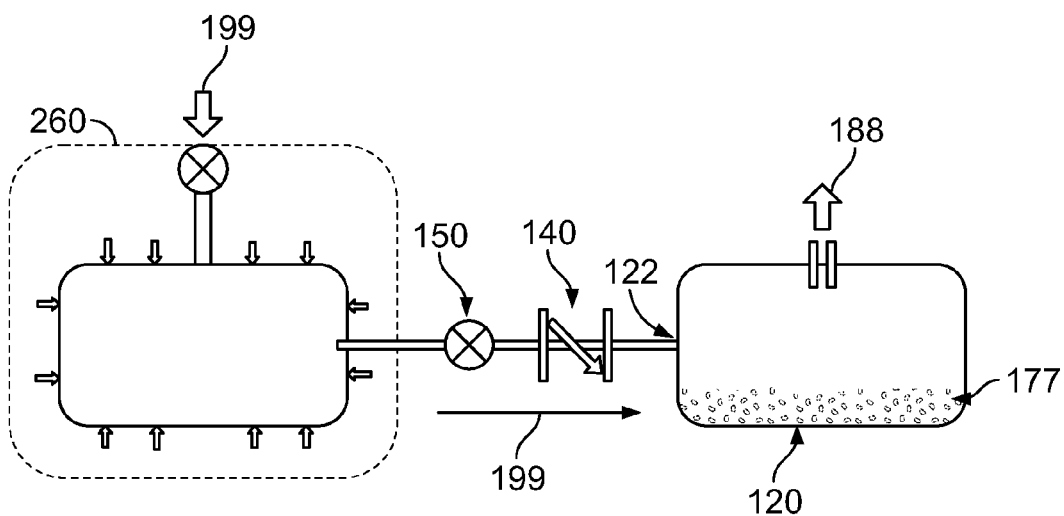
FIG. 2 illustrates a water feed fuel cell system and fuel cartridge and its related inputs and outputs.

Regardless of the manner in which the fuel cell 110 is ultimately secured to the water feed tray 130 and fuel cartridge 120, when properly connected, the fuel cell 110 pushes on the poppet 150 in the water feed tray 130 while simultaneously pushing the fuel cartridge 120 into the water feed tray 130 and onto the water tray needle 682 as shown in the side view depicted in FIG. 61) (and schematically in FIGS. 1 and 2). The valve poppet 150 and needle 682 combination are configured such that when the fuel cell 110 is engaged to the water feed tray 130, the poppet 150 is depressed, and pressurized water 199 from the bellows 260 is allowed to travel through the water feed tray 130 along water pathway 535, through the water tray needle 682, and into the fuel cartridge 120. To avoid spillage, the water feed tray 130, fuel cartridge 120, and fuel cell 110 are properly dimensioned with appropriate tolerances so that water 199 flows only when water feed tray needle 682 is inserted into a grommet 625 (see also needle valve 1329 in FIGS. 13A and 13B) within the fuel cell cartridge 120. Once water 199 reaches the reactant fuel material 177 in the fuel cartridge 120, hydrogen gas will form generating a pressure inside the fuel cartridge 120. The generated pressure will supply hydrogen 188 to the fuel cell 110 while also serving to limit the amount of additional water 199 that is input from the bellows 260 into the fuel cartridge 130.

As also shown in FIG. 6C, spring mechanism 670 can be employed to assist in ejecting the fuel cartridge 120 from the water feed tray 130. For example, the spring mechanism 670 can impart a physical force to fully move/eject the fuel cartridge 120 from the water feed tray 130 or to partially move/eject the fuel cartridge 120 from the water feed tray 130 to make it easier for a user to fully remove and/or to disconnect connect the fuel cartridge 120 from a water inlet point, such as the water inlet point 122 as shown in FIG. 2. Additionally, the spring mechanism 670 raises the fuel cartridge off of the water feed tray needle 682, so even if the plunger 533 was accidentally pressed, hydrogen production would be prevented. An additional view of the water feed tray 130 illustrating spring mechanism 670 is shown in FIG. 20.

Additional structural and operation details regarding the system 100, including water feed tray 130, fuel cartridge 120, and fuel cell 110 are provided below. The additional disclosure materials below describe additional structural and functional details of the water feed tray, fuel cartridge, and fuel cell in accordance with the claimed invention.

Water Feed Tray Feeding

Figure 4A:
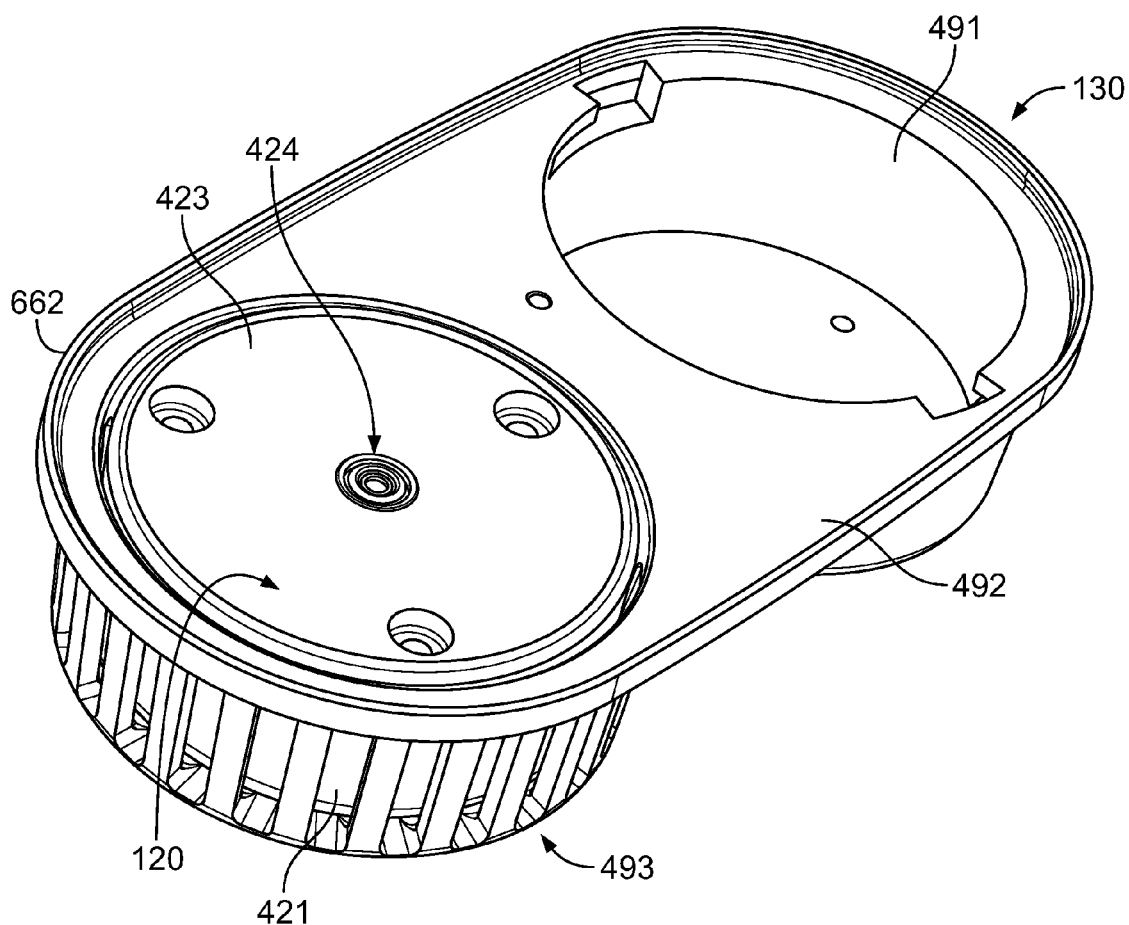
FIGS. 4A-4B illustrates structural characteristics of a water feed tray shown with a fuel cartridge inserted in the water feed tray.
Figure 4B:
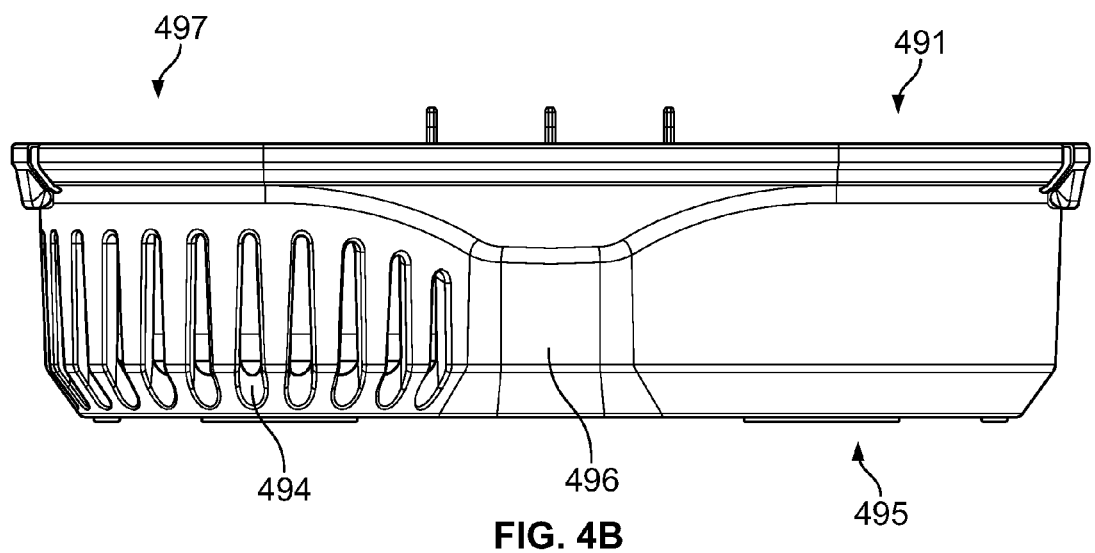

FIG. 4A illustrates a water feed tray 130 with a fuel cartridge 120 inserted. The fuel cartridge 120 shown includes an aluminum canister 421 and a plastic canister cap 423 with a hydrogen port 424. Water feed tray 130 can be divided into three major sections, including a bellows/water feed section 491, valve and poppet section 492, and fuel cartridge holder section 493. The water feed tray 130 can include a guide rail 662 for engaging or attaching the fuel cell 110. The water feed tray 130 can be made of an insulating plastic, such as a thermoplastic, polycarbonate, PC/ABS blend, or other material that provides for safe handling of the fuel cartridge 120. As shown in a side view in FIG. 4B, the example insulating plastic pattern can include slits 494 or other vent holes in the plastic for heat transfer and to allow for heat generated from the fuel cartridge 120 to dissipate as water 199 is fed to the fuel cartridge 120. Further, spray-on or other heat insulating materials, such as foams, aerogels, silicones, and the like can be added to the canister to provide insulation for a user and to allow safe handling and/or to provide thermal insulation to raise internal reaction temperature. Additionally, the insulating plastic can include feet 495 to provide a stand for the water feed tray 130. The insulating plastic can also include a tilted boss 496 for additional strength and durability and can also be used as an alignment device to ensure proper mating of the water feed tray and fuel cell 110.

The water feed tray 130 includes the water 199 that is pressurized and delivered to the fuel cartridge 120. As outlined above and shown in FIG. 2, the water feed tray 130 can utilize a bellows assembly 260 to contain and hold the water 199. Alternative methods of holding, pressurizing, and delivering the water 199 can also be used. For example, sliding pistons, collapsing diaphragms, inflatable diaphragms, and other deformable containers can be used as well as electrical pumps, such as piezoelectric pumps, and the like.

Figure 3:
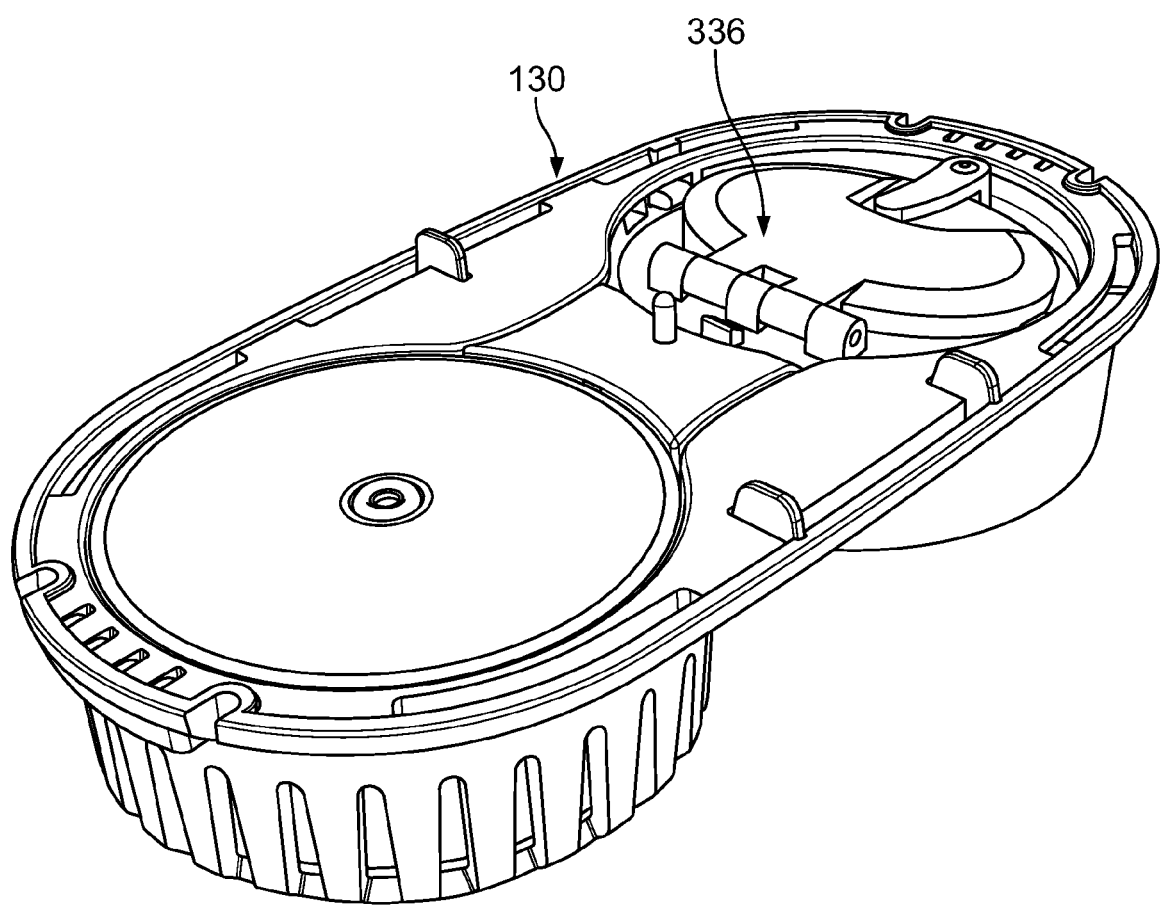
FIG. 3 shows an example of a water feed fuel cell system with a refillable water door and a fuel cartridge in accordance with the claimed invention.

As shown in FIG. 3, the water feed tray 130 can have an access door 336 to allow the user to easily fill or scoop water into the water feed tray 130. In another example implementation, the water feed tray can be sealed and a pump, syringe, or other pressurized water source can be used to fill the water feed tray 130 or to push water into a bellows assembly. In one example implementation, the access door 336 can act as a lever arm allowing for easier loading of a spring (such as inverted spring 834 shown in FIG. 8A and stamped plates in FIGS. 8B and 8C) that can provide water pressure.

Figure 8A:
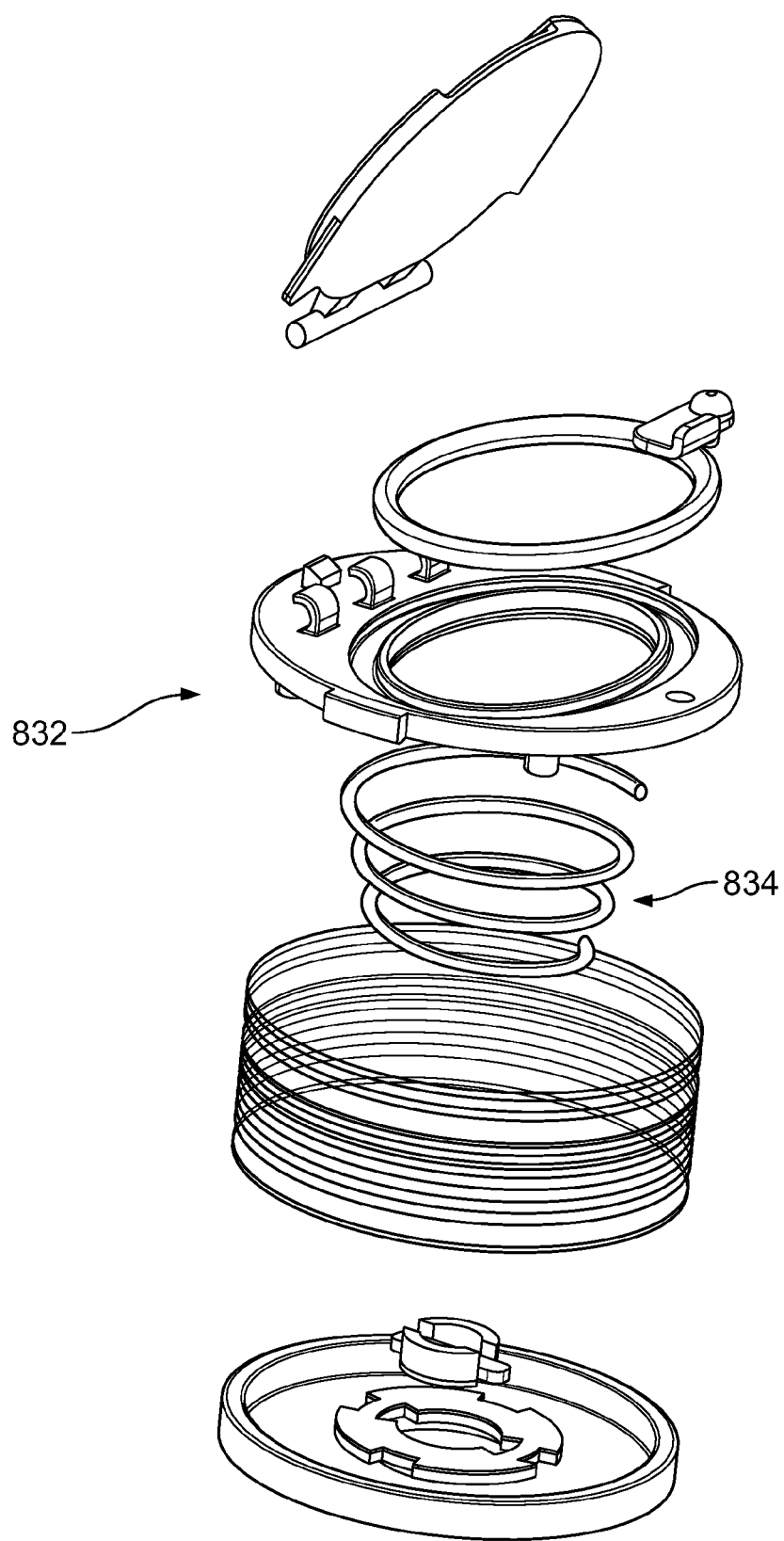
FIG. 8A illustrates a bellows spring assembly configured to store, pressurize, and output water in a water feed tray in accordance with the claimed invention.
Figure 8B:
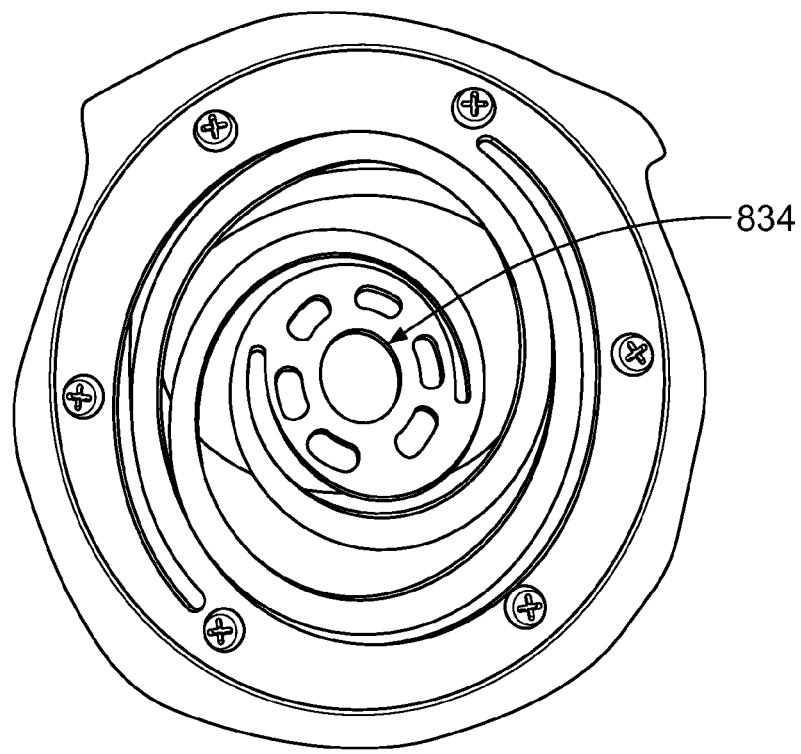
FIGS. 8B and 8C illustrate a bellows spring assembly in accordance with the claimed invention in a nominal compressed state and in a loaded state, respectively.
Figure 8C:
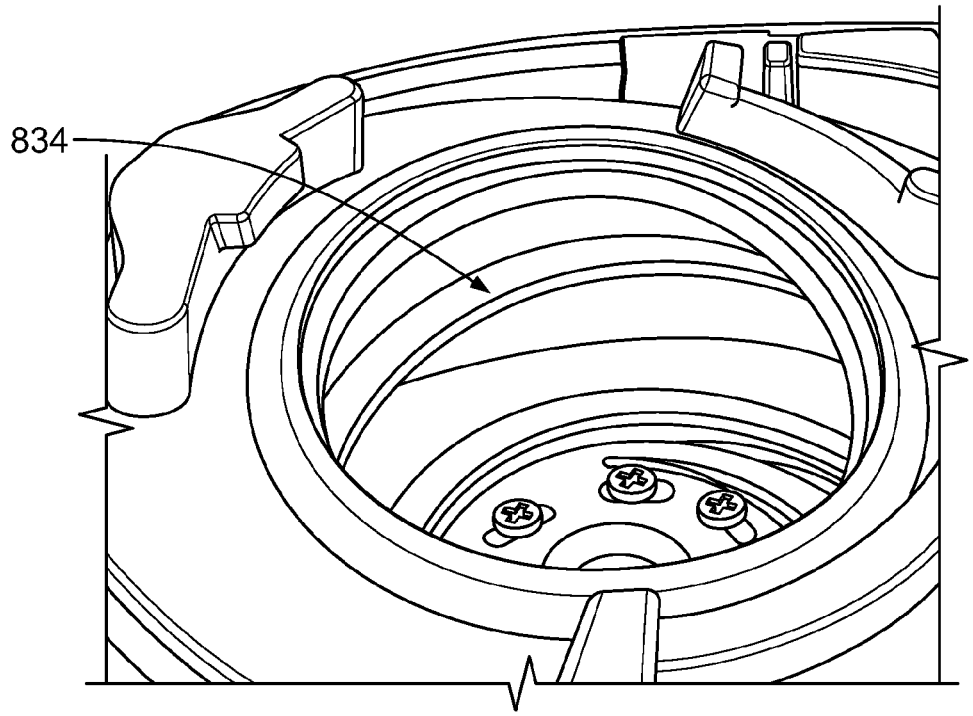
Figure 8D:
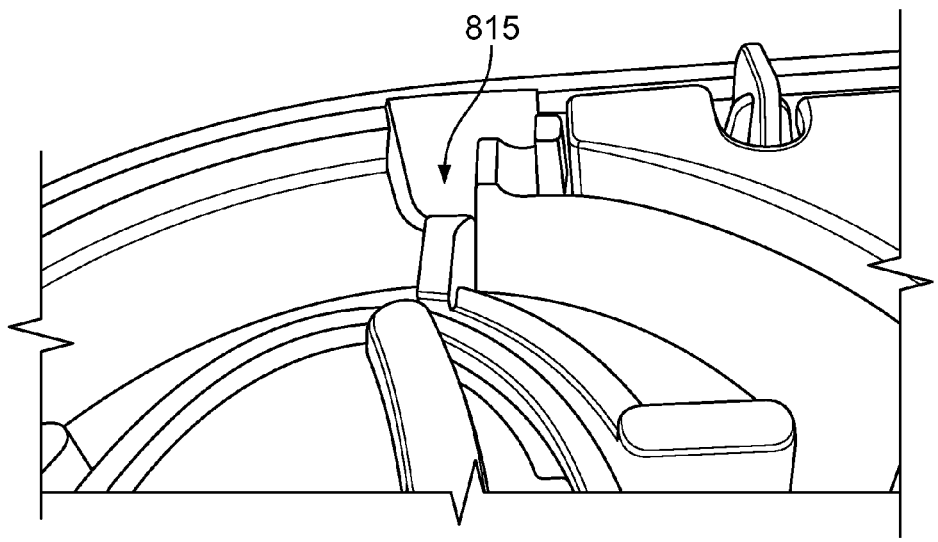
FIGS. 8D and 8E illustrate a bellows spring assembly and locking shelf in accordance with the claimed invention in a disengaged position and in an engaged position, respectively.
Figure 8E:
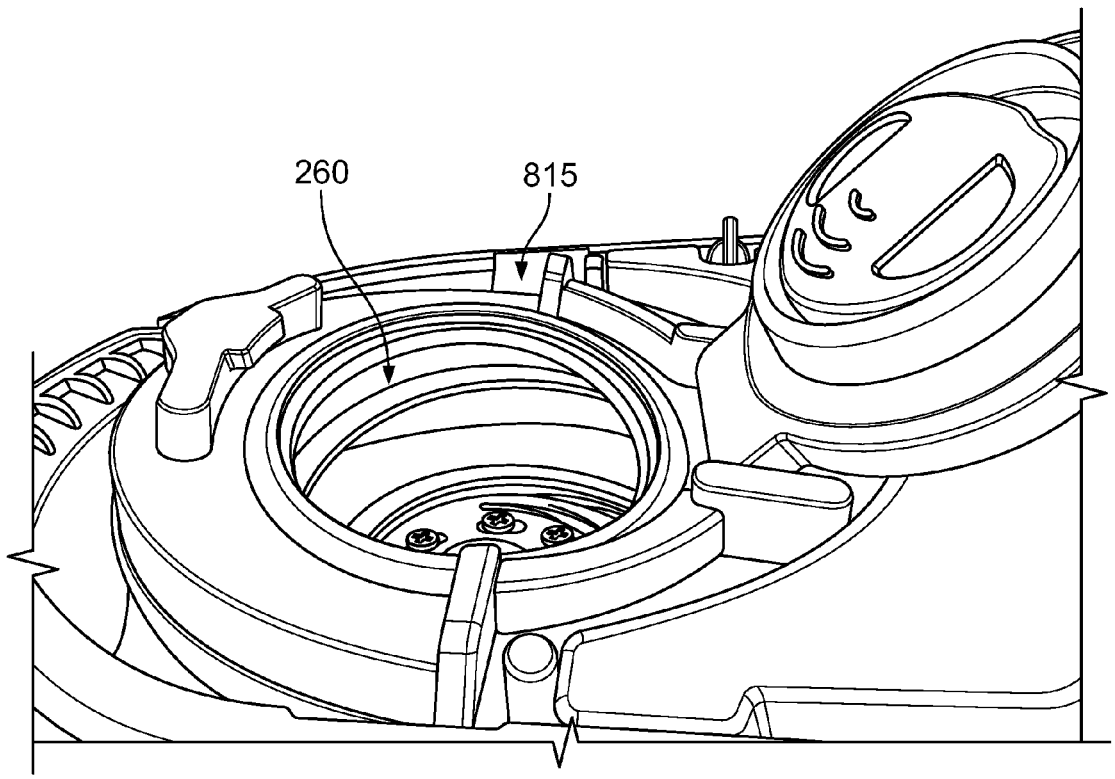
Figure 8F:
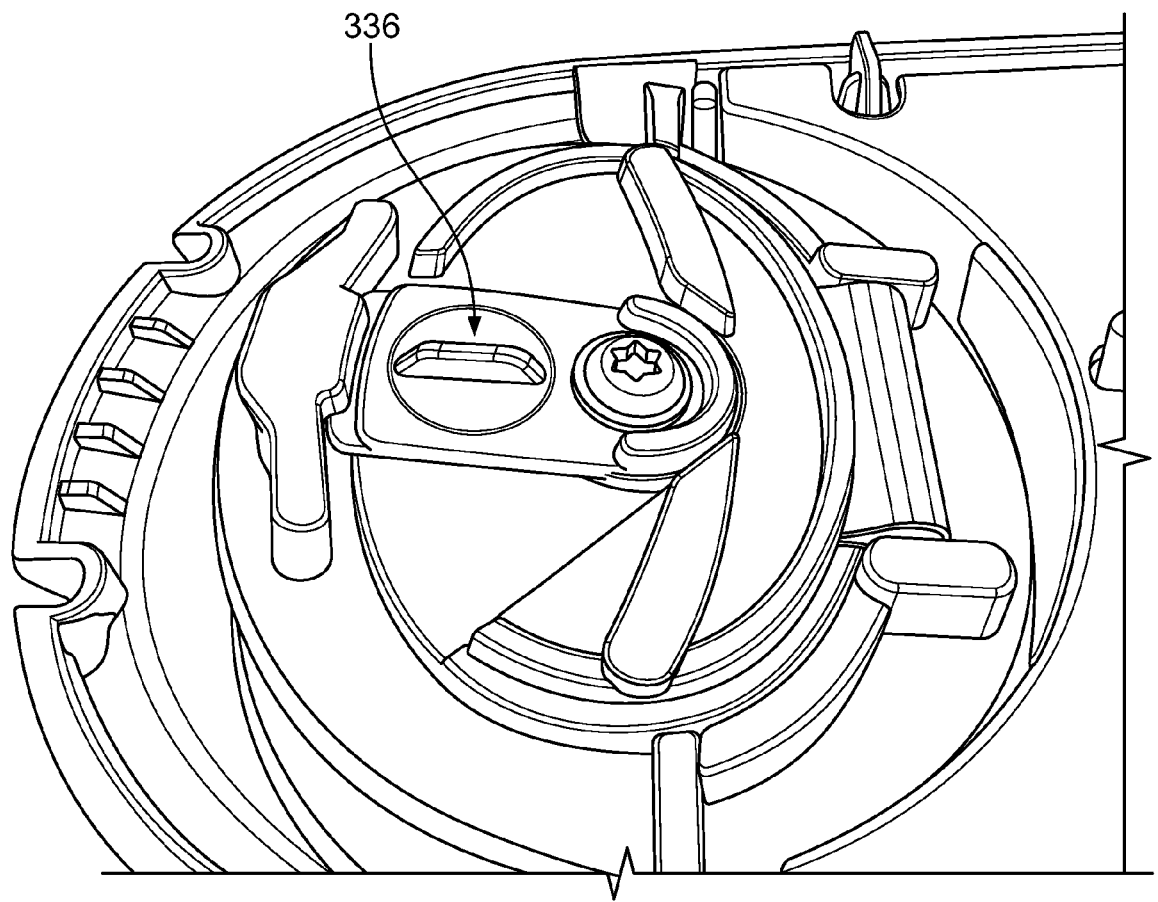
FIG. 8F illustrates a bellows access door in accordance with the claimed invention in an engaged position.

As shown in FIGS. 3 and 8F, the water feed tray 130 can have an access door 336 to allow the user to easily fill or scoop water into the water feed tray 130. A user can press down on bellows access door 336 to disengage a locking shelf 815 and prepare the water feed tray 130 for use. Access door 336 can provide access to the bellows (not shown separately in FIG. 3) to contain and hold the water 199. For example, the door/bellows combination can be rotated or translated to put the spring 834 into a locked position, which loads the spring 834. In the locked position shown in FIG. 8E, the user can easily add more water to the bellows 260 without the bellows self-collapsing. Once the bellows 260 is filled with water 199, the user locks the bellows door 336 closed as shown in FIG. 8F, which seals the water 199.

An example of the spring 834 in its nominal (down) position is shown in FIG. 8B. When fully assembled in the water feed tray 130, the spring 834 is pulled through itself in the opposite direction (up) to load as shown in FIG. 8C.

Figure 11:
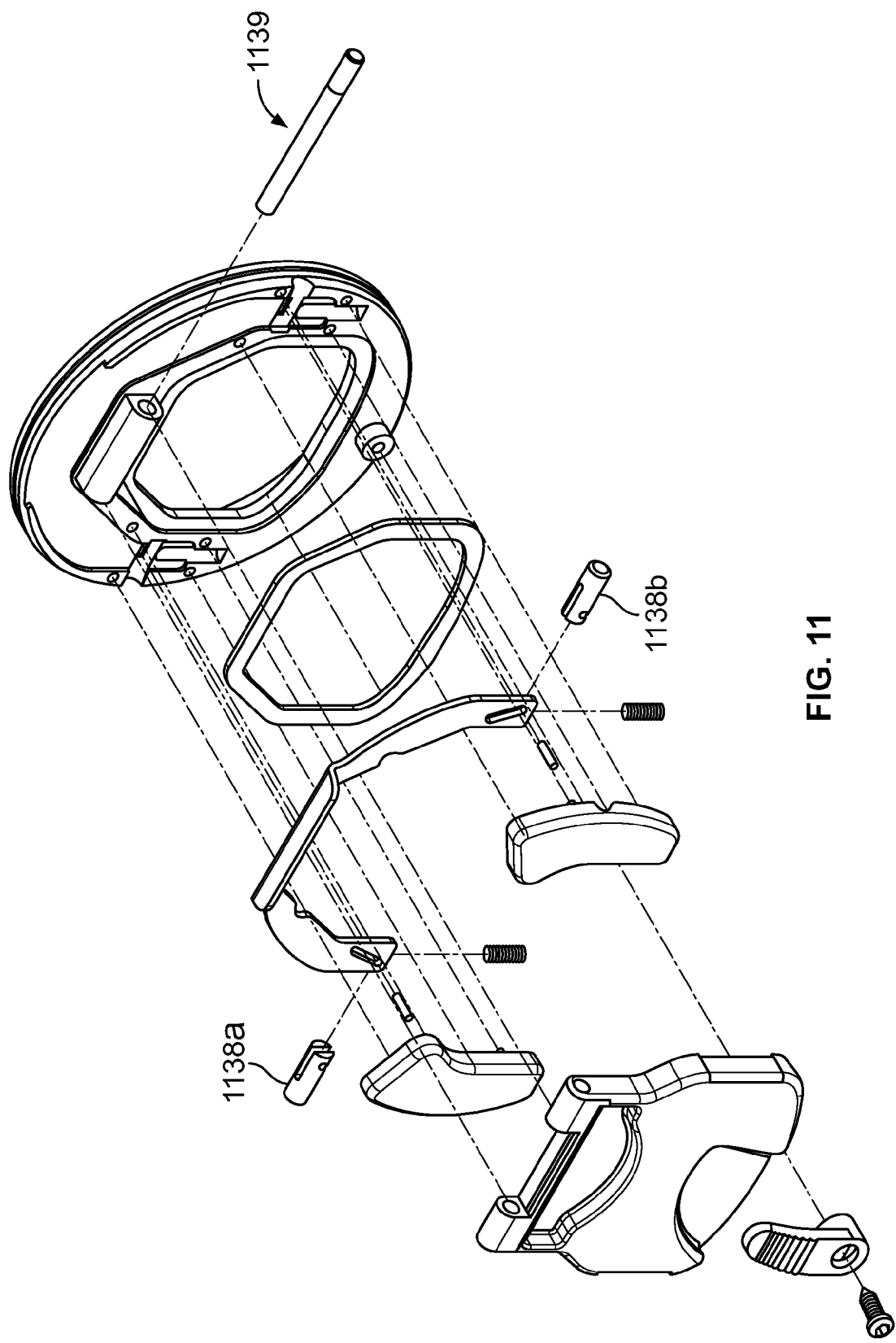
FIG. 11 illustrates structural components for the top of a bellows assembly to lock the tray door open when refilling water in a fuel cell system in accordance with the claimed invention.
Figure 12A:
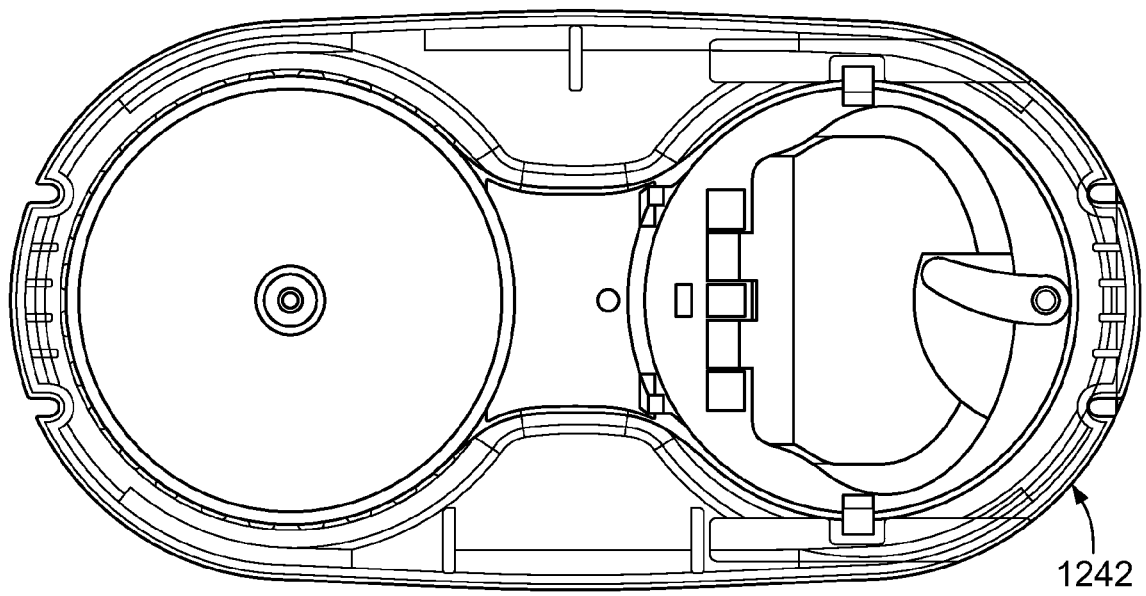
FIGS. 12A and 12B are top ad perspective views, respectively, that illustrate a locking mechanism to lock the fill door open when refilling water in a fuel cell system in accordance with the claimed invention.
Figure 12B:
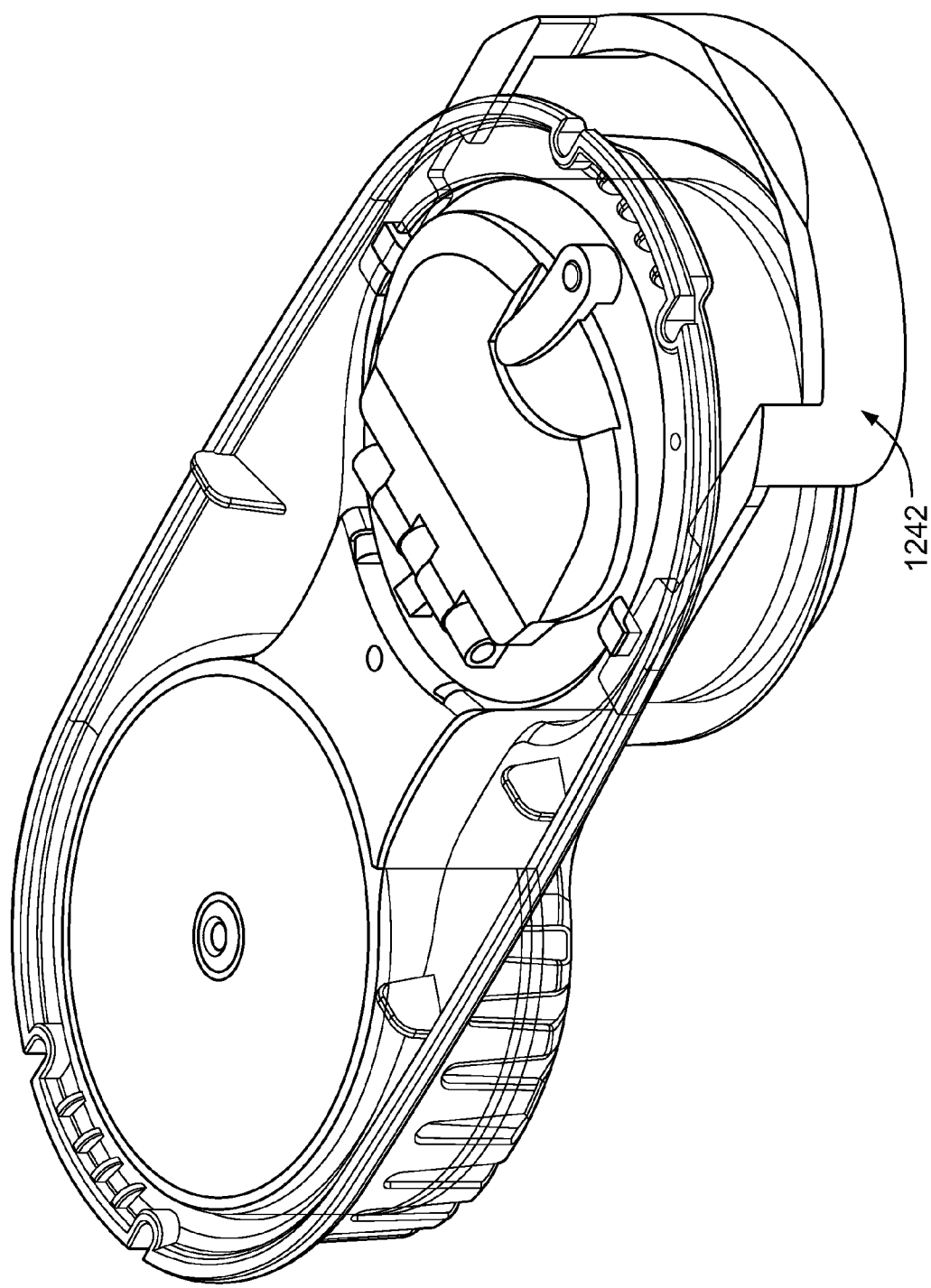

As further shown in FIG. 8D, the bellows 260 assembly can then be rotated or translated off a locking shelf 815 to activate the spring 834. The spring 834 then pressurizes the water 199 in the bellows 260 where it can flow to fuel cartridge 130. Of course other locking mechanisms can be used to gain access to the bellows 260 to add water 199 and to load the spring 834. For example, locking pins 1138a, 1138b, 1139 can be used to secure the bellows 260 as shown in FIG. 11. Additionally, sliding rods 1242 can be used to gain access to the bellows 260 to add water 199 and to toad the spring 834. Examples of the sliding rods 1242 are shown in a locked position in FIG. 12A and in an unlocked position in FIG. 12B.

Figure 5A:
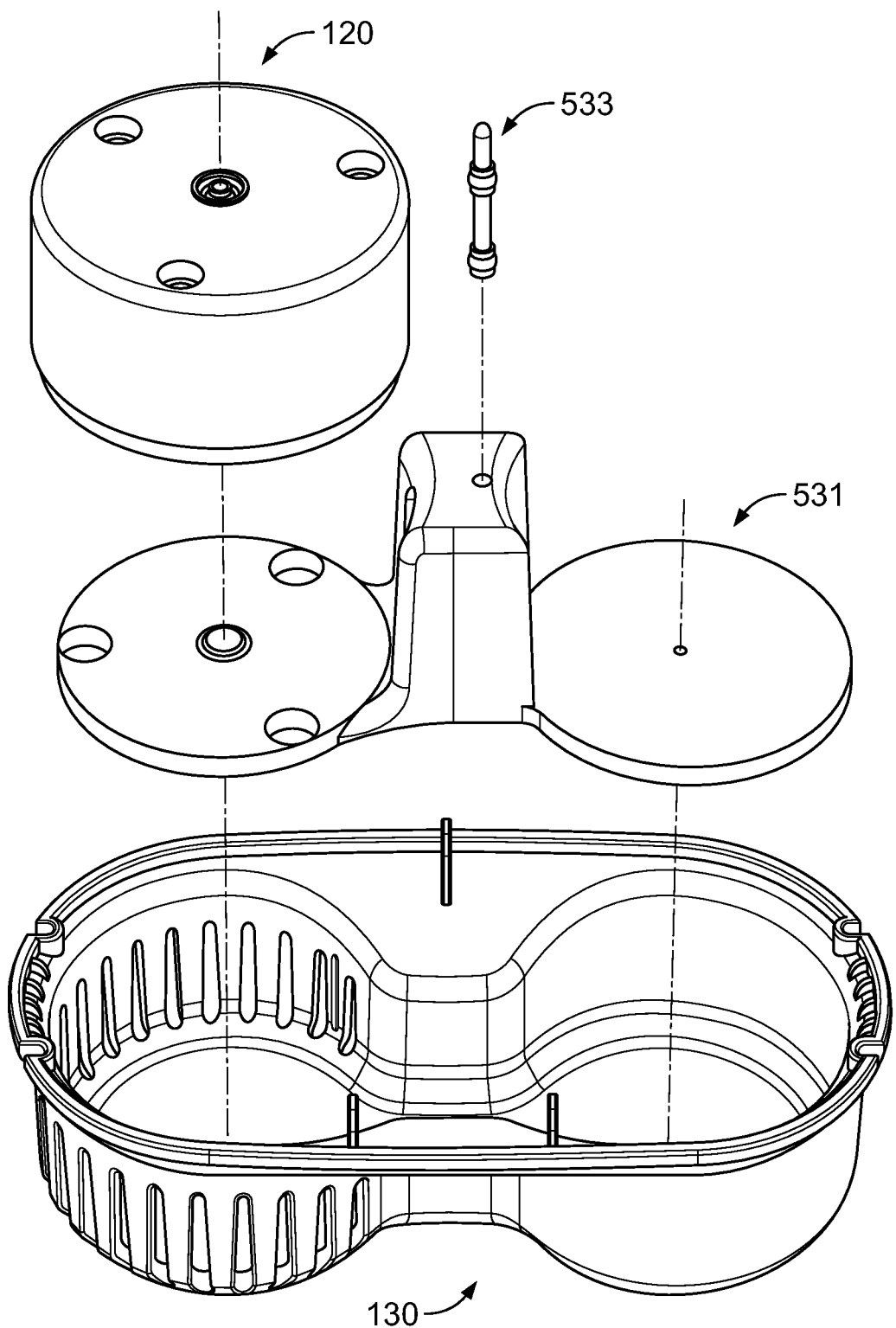
FIG. 5A shows an exploded view of a water feed fuel cell system shown with a fuel cartridge.
Figure 5B:
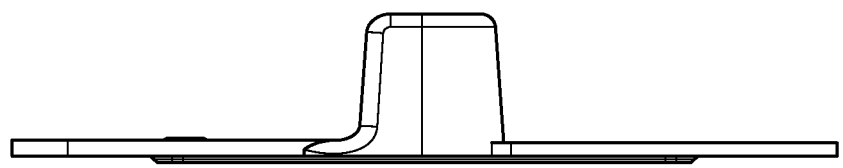
FIG. 5B shows a side view of the water tray insert.
Figure 5C:
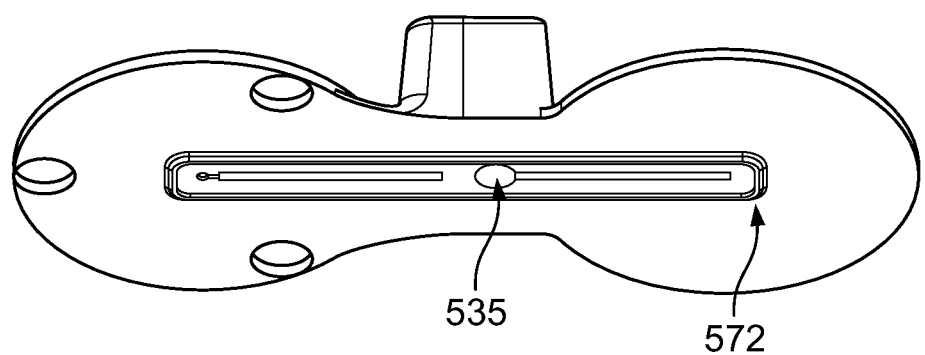
FIG. 5C shows the bottom of the water tray insert.

As shown schematically in FIGS. 1 and 2, after the locking mechanism is disengaged, the water 199 is ready to be delivered to the fuel cartridge 120. FIG. 5 shows an exploded view of the water feed tray 130, a water tray insert 531, and a fuel cartridge 120 and water pathway 535 that connects a bellows assembly (not shown separately in FIG. 5) to the fuel cartridge 120.

Figure 19A:
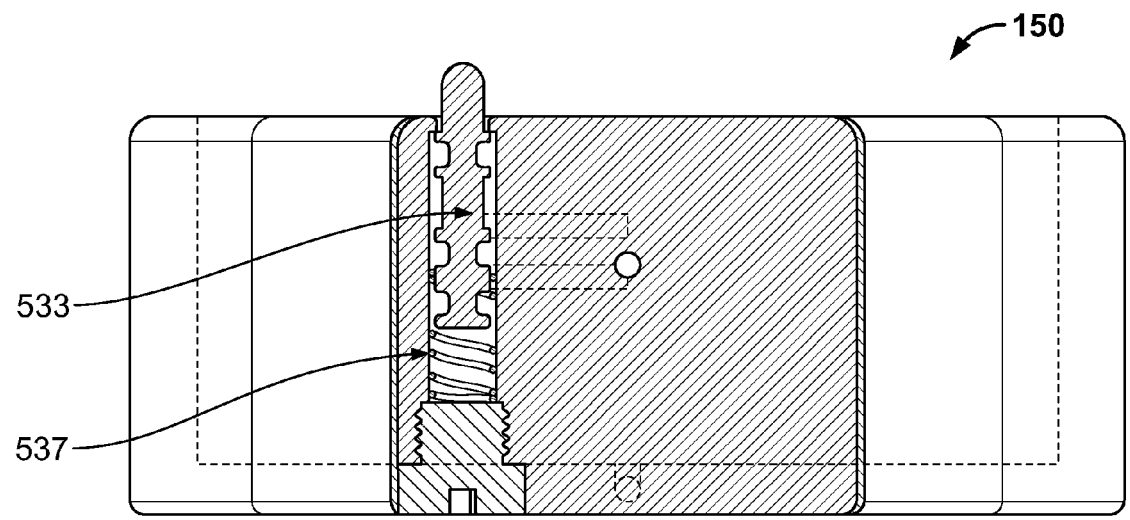
FIGS. 19A and 19B show an automatic mechanical water control valve and plunger for use in a hydrogen fuel cell power system in accordance with the claimed invention in an open position and a closed position, respectively.
Figure 19B:
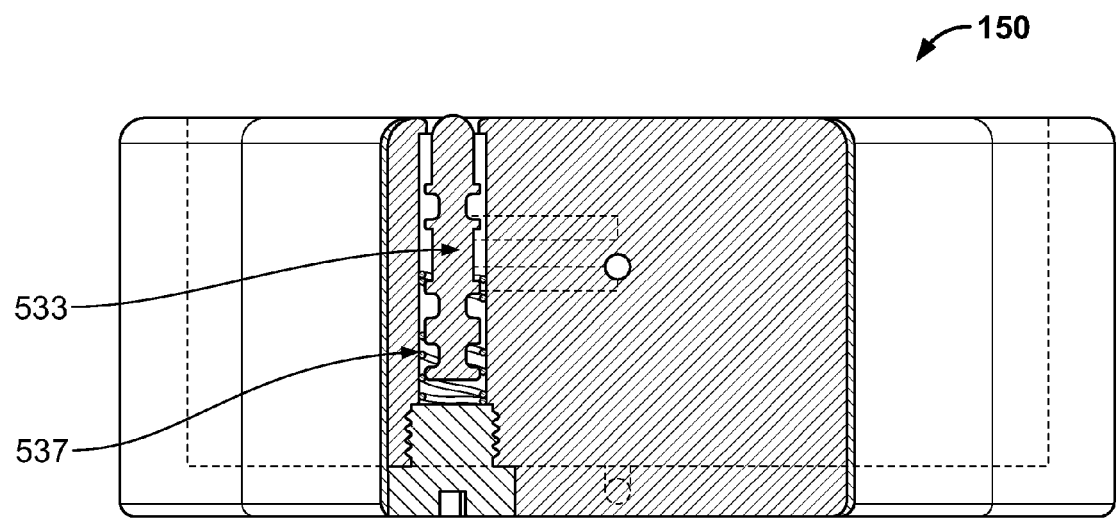

In one example implementation, a plunger 533 in poppet 150 is in line between the bellows assembly containing the water and the fuel cartridge 120. A detailed drawing of the plunger 533 and poppet 150 in an open position (water 199 flowing from bellows to fuel cartridge 120) is shown in FIG. 19A, and a drawing of the plunger 533 and poppet 150 in a closed position (*ater 199 not flowing from bellows to fuel cartridge 120) is shown in FIG. 19B. The plunger 533 keeps water 199 from leaving the bellows assembly during storage or while the user is preparing a fuel cartridge 120 or loading a fuel cartridge 120. The plunger 533 is opened and water 199 is allowed to travel along water pathway 535 when the fuel cell 110 is engaged and locked into position with the water feed tray 130 as described above. The water tray insert 531 can be integral to the water feed tray 130 or can be attached using a number of sealing mechanisms including glue/epoxy, ultrasonic bonding, physical compression, gaskets, and the like. An example of an ultrasonic welding bead is shown as reference numeral 572.

When the fuel cell 110 is disengaged from the water feed tray 130, the water flow will stop as a spring 537 puts the valve spring into its normally closed position (shown in FIG. 19B). The plunger 533 and/or poppet 150 can also be an electronically actuated valve(s) where a sensor(s) is used to detect connection/disconnection of the fuel cartridge 120, water feed tray 130, and fuel cell 110. In one example implementation, a permanent magnet is constructed as part of the valve assembly. An electrical coil and appropriate drive electronics can be located in the fuel cell 110, which can be integrated with existing fuel cell control electronics. Additionally, a miniature pump can also be used to deliver the water under pressure. A miniature pump also allows for control of the water flow rate which can generate a hydrogen pressure. A control scheme can be used to control the pressure to a desired value or within a nominal range.

In addition to the spring mechanism 670 shown in FIG. 6C and FIG. 20 that can be employed to assist in ejecting the fuel cartridge 120 from the water feed tray 130, a spring mechanism 497 (shown in FIG. 4B) can also be used to push the fuel cartridge 120 against the fuel cell 110 to provide the force required for a gas (hydrogen) seal. The spring mechanism 497 can be a physical spring, such as helical or coil springs, compression springs, flat springs, beams, and the like. For example, the spring mechanism 497 can impart a physical force to fully seal and stabilize the fuel cartridge 120 to the fuel cell 110 such that the hydrogen port 424 of the fuel cartridge 120 provides hydrogen to the fuel cell 110 without leakage.

As described above, when a spring 834 is used in conjunction with a bellows assembly 260 to pressure the water 199, the system 100 provides an additional mechanism to prevent transient high pressure spikes from reverse-pressurizing the spring 834. The high pressure spikes can result in perturbations in pressure and water delivered at an oscillating rate. If the spring 834 is reverse-pressurized, higher water surges can result in oscillatory and/or a positive feedback situation resulting in unintended escalating pressure spikes. Multiple methods can be utilized to prevent transient high pressure spikes from reverse-pressurizing the spring 834. For example, in one implementation outlined above with regard to FIGS. 1, 4, and 8, a check valve 140 can be used to isolate pressure spikes to the fuel cartridge holder section 493 side of the water feed tray 130. The check valve 140 in tandem with the spring 834 provides pressure regulation to isolate pressure spikes and to eliminate oscillating amounts of water delivered to the reactant fuel material 177. The check valve 140 can be integral to the water 199 storage and feed, located separately in a check valve and poppet housing 745 or included as part of fnel cartridge 120. When the check valve 140 is placed prior to the reactant fuel mixture 177, perturbations in pressure can be eliminated and uniform volumes of water 199 can be delivered to the reactant fuel mixture 177 in the fuel cartridge 120. Other mechanisms to prevent transient high pressure spikes from reverse-pressurizing the spring can also be employed, such as a controlled on/off valve can be used to eliminate perturbations in pressure and water delivered at an oscillating rate. Another device that can be used is a bleed-off valve, which can simply vent any excess pressure either by way of a valve or through the fuel cell 110. In each case, a check valve in combination with the spring can be used to eliminate fluctuations in water pressure and flow rates to the fuel cartridge 120.

Figure 9:
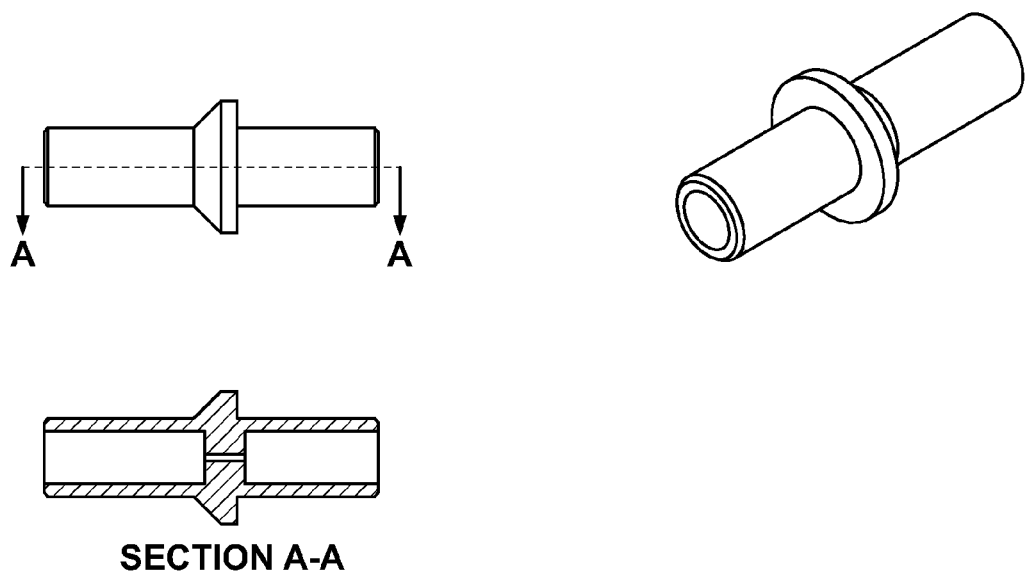
FIG. 9 illustrates a tube-connection water flow limiting orifice in accordance with the claimed invention.
Figure 10:
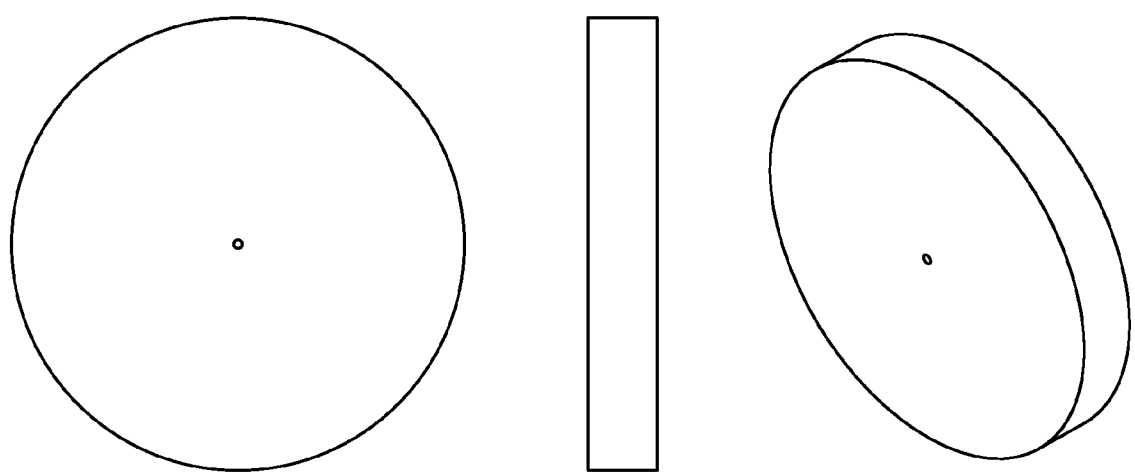
FIG. 10 shows a disk-type water flow limiting orifice in accordance with the claimed invention.
Figure 18A:
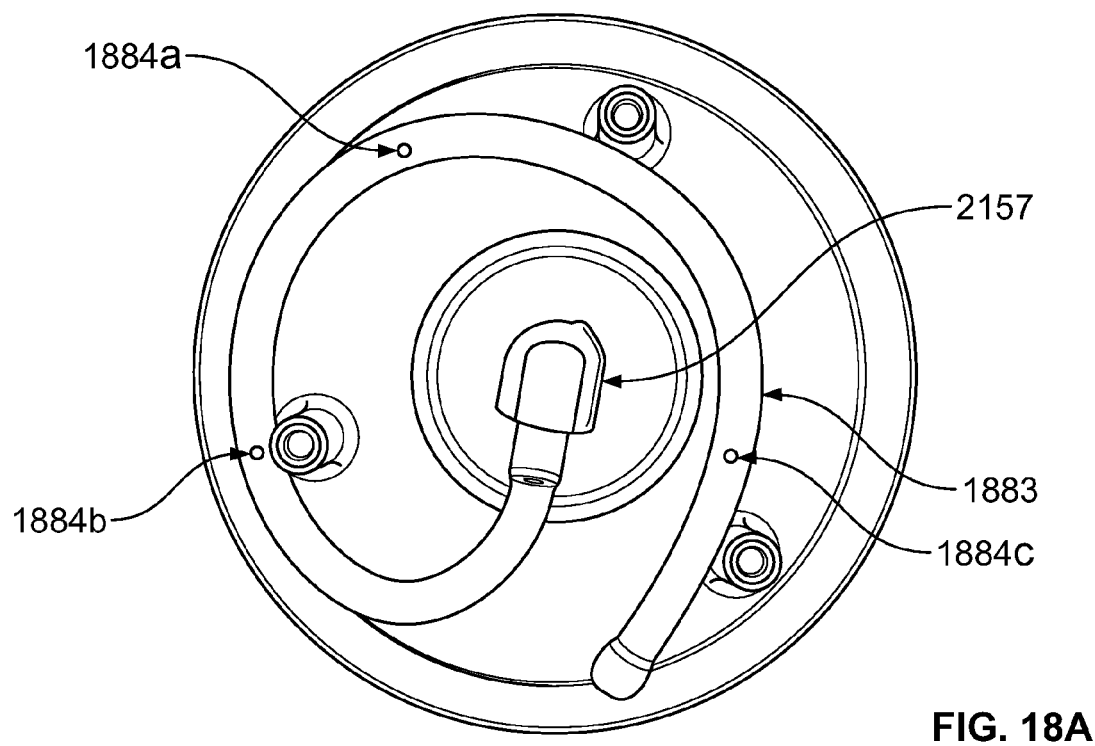
FIG. 18A shows a canister with a coiled reaction feed tube for use in a hydrogen fuel cell power system in accordance with the claimed invention.
Figure 18B:
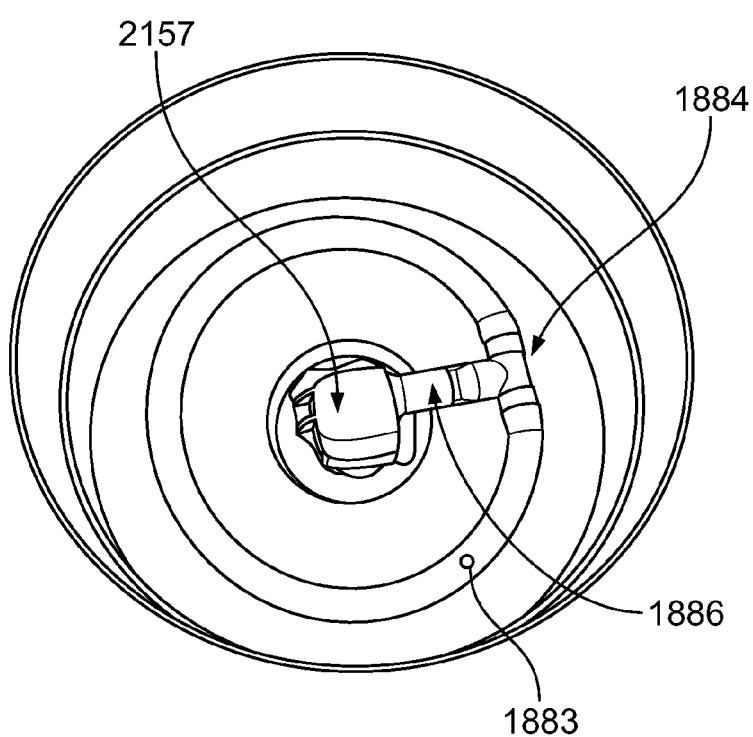
FIG. 18B shows a canister with a T-fitting and coiled reaction feed tube for use in a hydrogen fuel cell power system in accordance with the claimed invention.

As shown in FIG. 18B, a water flow limiter, such as water flow limiting orifice 1886 can be used to prevent excessive water flow from being delivered to the fuel cartridge 120 in certain transient conditions. The water flow limiting orifice 1886 can serve as a safety limiter of the water input rate. The water flow limiting orifice 1886 can regulate the rate of the delivered water to provide sufficient time for the chemical reaction between the reactant fuel material 177 and the water 199 to generate hydrogen pressure. Failure to limit the water flow can cause excessively large amounts of water to be delivered to the fuel cartridge 120 resulting in high pressure spikes. A flow limiting orifice can be incorporated in the fuel cartridge, water feed system, or both. For example, in one implementation shown in FIG. 18B, the water orifice 1886 could be 0.007 inch hole in a solid disc that is pushed into the tubing or the grommet. A detailed view of a tube connection water flow limiting orifice is shown in FIG. 9, while a disk type water flow limiting orifice is shown in FIG. 10. In another implementation, it can be molded directly into one of the rubber water distribution components. In the implementation shown, the orifice is fabricated as part of barbed fitting which allows it be coupled directly to tubing. In another implementation, one side of the barbed water orifice can be inserted directly into the grommet without need for an additional interface fitting, Fuel Cartridge As shown in further detail in FIGS. 13A, 13B, and 14A, the fuel cartridge 120 is designed for the "water-reactive" class of cartridges. That is, the reactant fuel material 177 in the fuel cartridge 120 undergoes a chemical reaction with water. The chemical reaction generates hydrogen gas, which is combined with oxygen or another oxidizing agent in the fuel cell 110 to generate electricity.

In one example implementation, the fuel cartridge 120 is constructed using a thin-walled metal canister 1426 that includes a water-reactive fuel material 177 (powder) and a plastic top cap 1327. The metal canister 1426 can be sized for convenient handling and use in conjunction with the water feed tray 130. For example, the metal canister 1426 can be circular with a range of diameters, some being from between 40 and 60 mm, such as the 51 mm diameter shown in FIGS. 13A, 13B, and 14A. The canister 1426 can be made with a range of heights, some being from between 10 and 30 mm, such as the 19 mm height shown in FIGS. 13A, 13B, and 14A. The canister 1426 can be made of impact extruded aluminum and can be plated with other materials, such as metals, polymers, or epoxys, for example. A plastic top cap 1327 can be used to seal the canister 1426. Canisters and caps of other materials, such as all plastic, all metal, flexible-walled, can also be used and can be selected based upon the type of water-reactive fuel material used, whether water or a different solution is used, whether the fuel canister and/or cap is to be re-used.

Figure 16B:
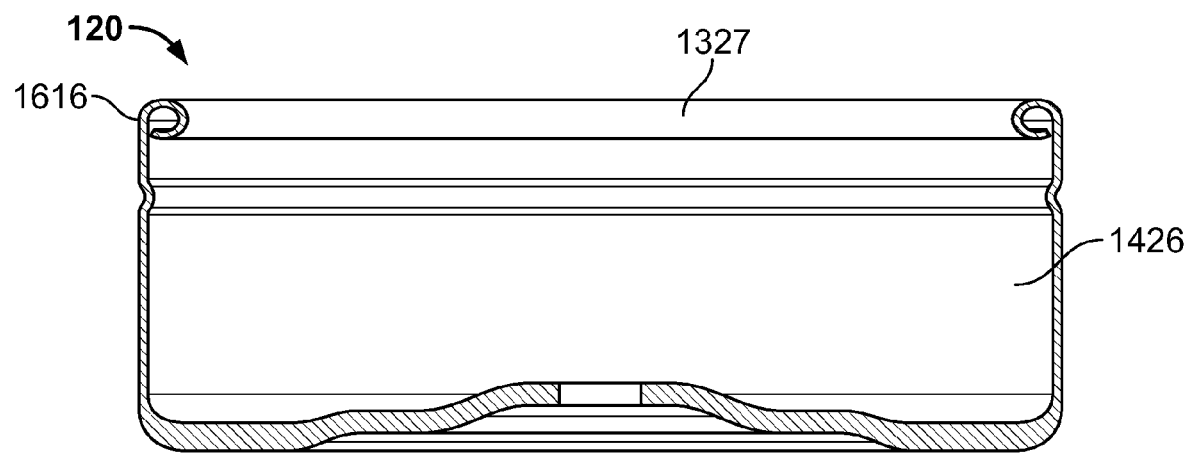
FIG. 16B is a cross-sectional view of a fuel cartridge that has been assembled using a roll-over crimp and the crimping tool of FIG. 16A.

In one example implementation, the canister 1426 can be connected to the cap 1327 by a mechanical crimp. Plastic top cap 1327 can be crimped to seal the fuel cartridge 120 using crimping tool 1606 as shown in FIG. 16. Crimping tool 1606 can be used to make a rollover crimp in construction of the fuel cartridge 120 as shown in FIG. 16B. In this example, the fuel cartridge 120 body includes the metal canister 1426 and the cap 1327. By applying pressure through the press crimping tool 1606 directly down onto the canister and cap, the wall of the canister 1426 rolls over the top of the cap 1327. This enables the use of very thin walled filet cartridges while providing a highly robust cap restraint mechanism. This technique and construction can also readily be fabricated in high volume production using a rapid vertical compression to create the rollover cartridge crimp.

Figure 13A:
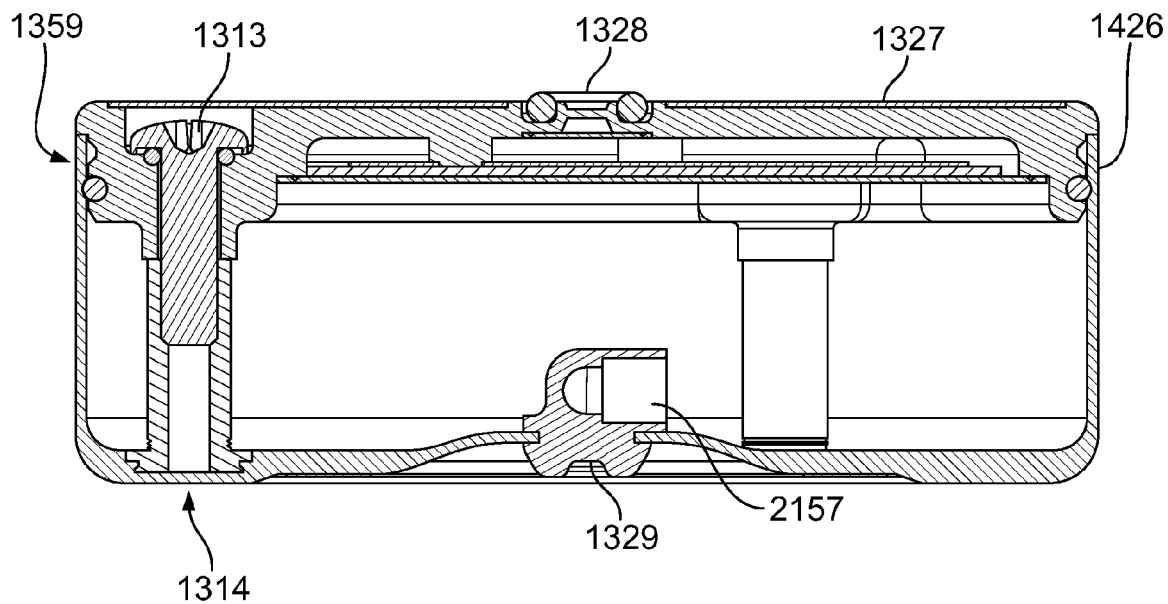
FIGS. 13A and 13B are cross sectional views illustrating structural details of a fuel cartridge for use in a hydrogen fuel cell power system in accordance with the claimed invention.
Figure 13B:
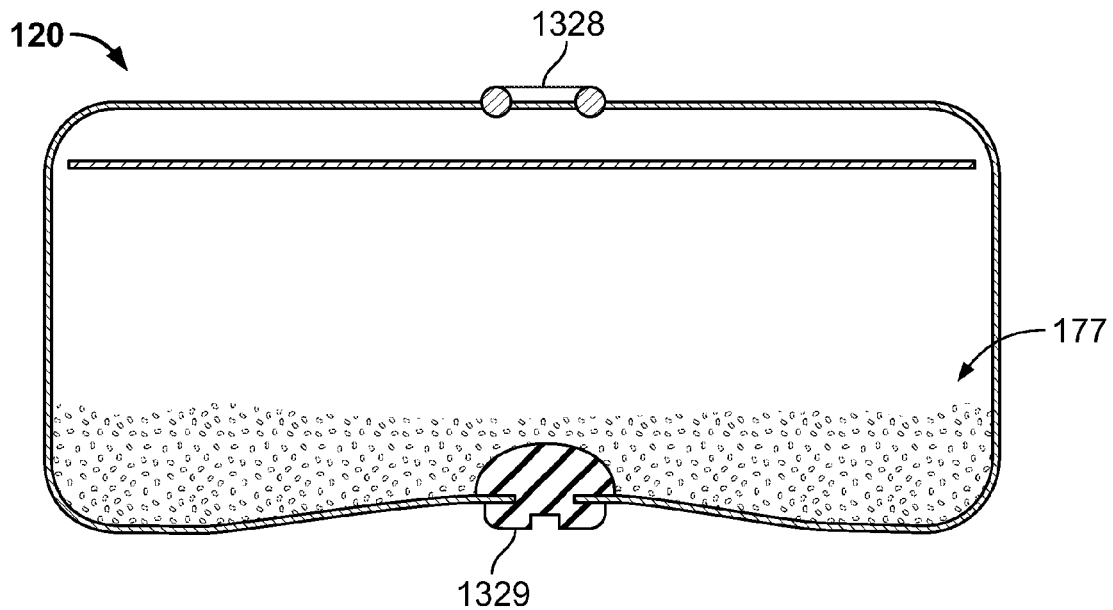
Figure 14A:
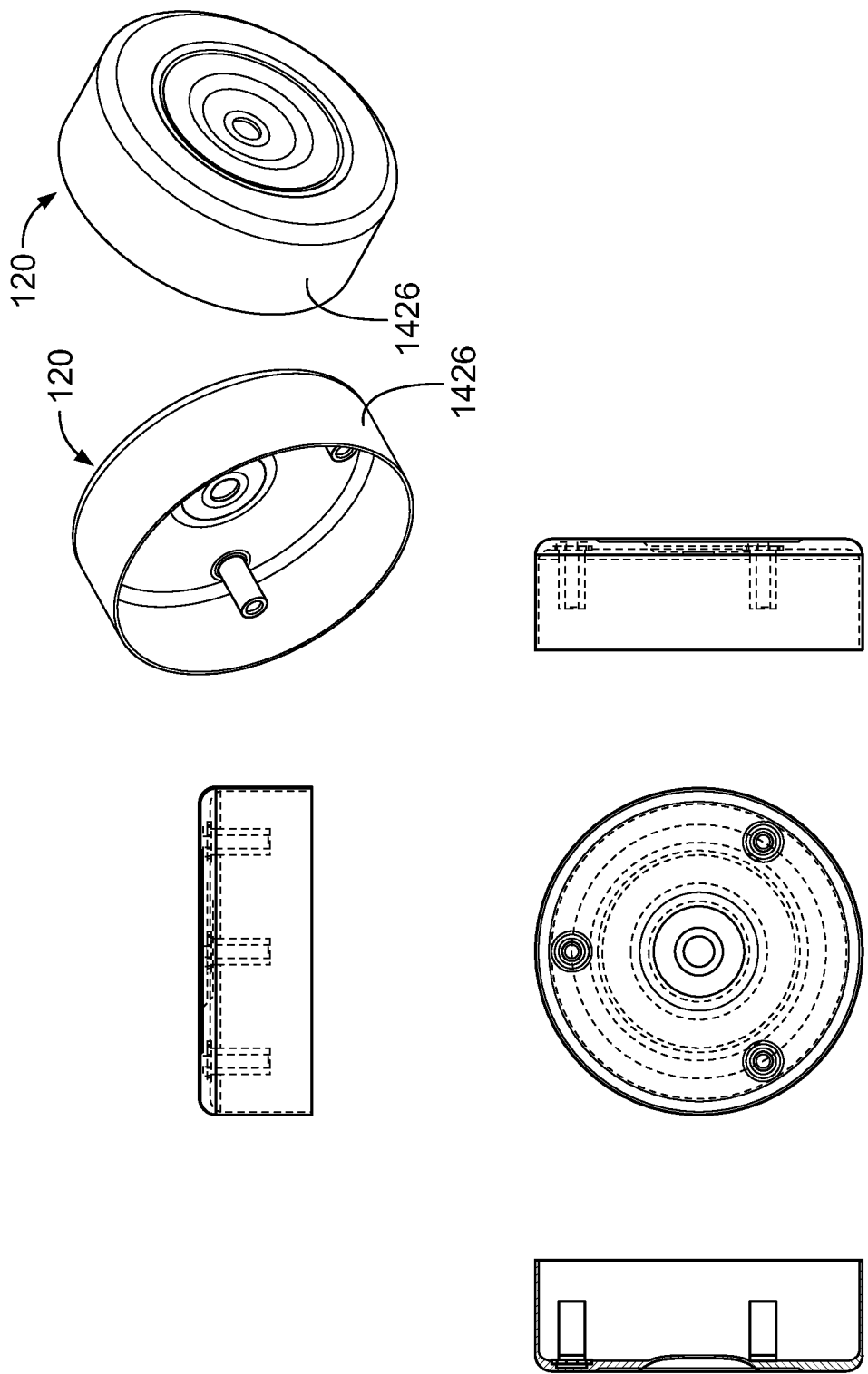
FIG. 14A illustrates further structural details of a fuel cartridge canister for use in a hydrogen fuel cell power system in accordance with the claimed invention.

As shown in FIGS. 13A and 13B, alternatively (or in combination), the fuel cartridge 120 can also include a sealing screw 1313 and threaded PEM standoff 1314 combination to secure the cap 1327 to the canister 1426. The screw/standoff combination can be connected inside or outside of the can. The screw/standoff approach allows for reusable caps 1327 and canisters 1426, while crimp connections allow for lower weight, lower cost, and disposability. Of course other types of joining mechanisms and fasteners such as glue, epoxy, welds, bolts, clips, brackets, anchors, and the like can also be used. Fuel cartridge 120 can also include a filtration assembly 1359 that can be used to filter the hydrogen 188 before it is used in the fuel cell 110.

Figure 17:
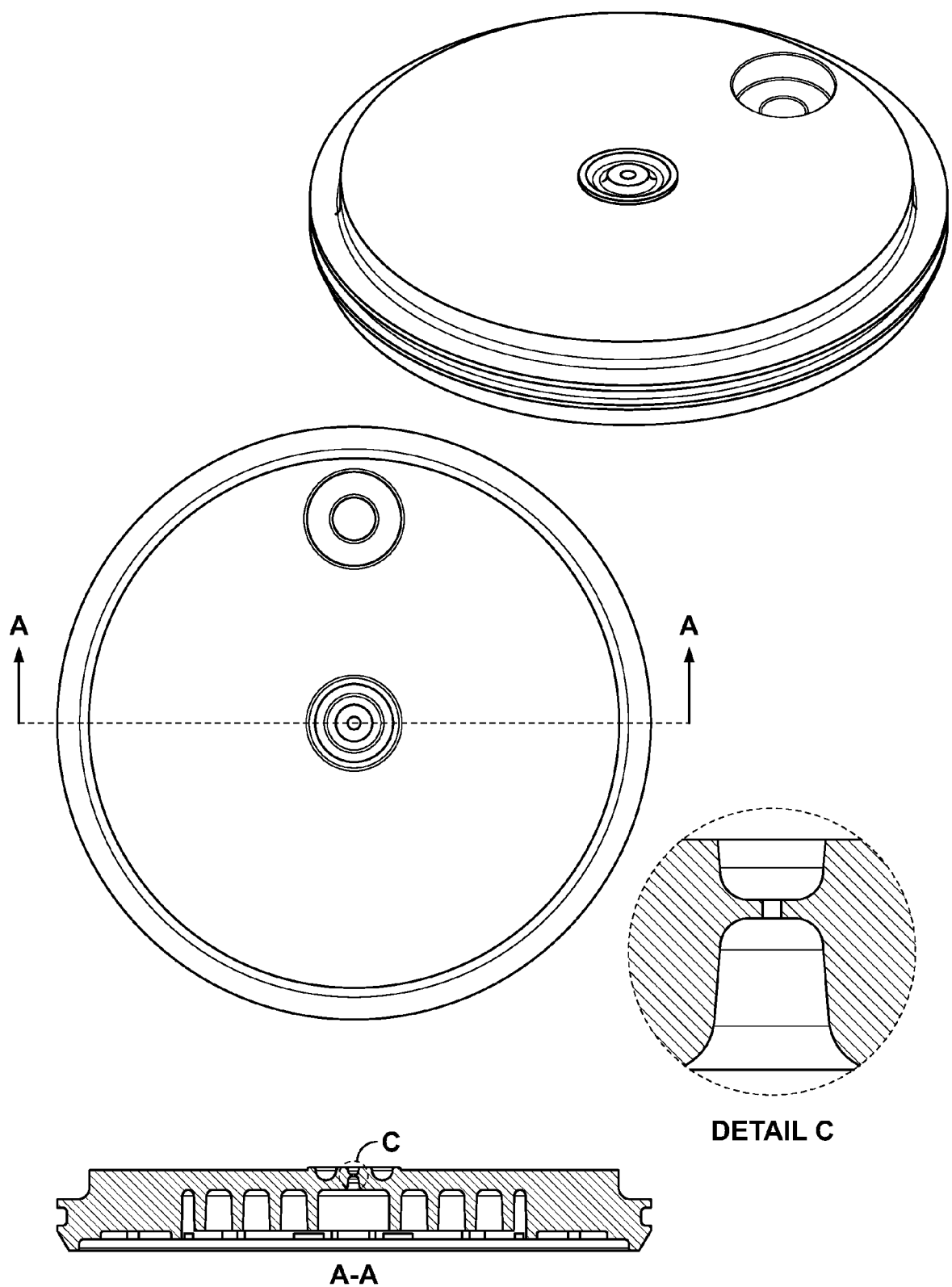
FIG. 17 shows an example of a cartridge valve integrally mounted to a fuel cartridge cap in accordance with the claimed invention.

Shown in FIGS. 13A and 13B, the valve between the fuel cartridge 120 and the fuel cell 110 is referred to as the cartridge valve 1328. Another example of a cartridge valve integrally mounted to the cap 1327 is shown in FIG. 17. In the implementation shown, the orifice in the plastic cap 1327 provides the core function of a cartridge valve (i.e. hydrogen flow control) in a simple-to-manufacture package. Cartridge valve 1328 can include an o-ring type compression fitting about the orifice, for example, using a compression force of up to approximately 20 N to compress the o-ring, at a distance of 1.5 mm.

In some example implementations, the fuel cartridge 120 can have two sealed locations, where one sealing location (cartridge valve 1328) allows hydrogen 188 to pass from the fuel cartridge 120 to the fuel cell 110, and another sealed location (needle valve 1329) allows water 199 to be inserted into the fuel cartridge 120. In FIG. 21A, a perspective view of the needle valve 1329 is shown. Also, in FIG. 21B, a detailed cross sectional view of the needle valve 1329 is shown. The needle valve 1329 can be constructed along the functional tines of a sports ball grommet. As a water sealing device, needle valve 1329 allows water, liquids, or other solutions to be inserted into the canister 1426 via a needle or other penetrating source. Upon removal of the needle or penetrating source, the liquid will not drain or otherwise flow from the fuel cartridge 120. In one or more example implementations, a silicone grommet is used as the needle valve 1329 and is opened with the insertion of the water feed tray needle 682. Upon removal of the fuel cartridge 120 from the water feed tray 130, the water feed tray needle 682 is removed from the fuel cartridge 120, and the silicon grommet self-closes to form the seal.

Figure 13C:
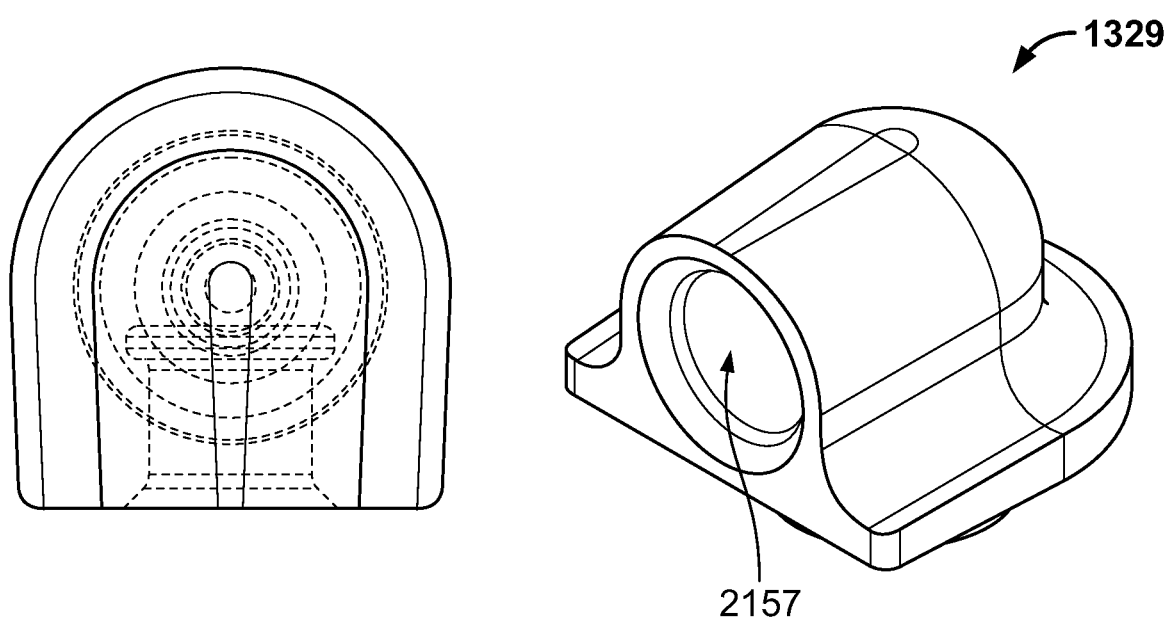
FIG. 13C is a perspective view of an angled needle valve in accordance with the claimed invention.

The needle valve 1329 can be constructed of silicon, or other rubbers, with a number of different hardness specifications and dimensions. For example, the needle valve 1329 shown in FIGS. 13A, 13B, 21A and 21B is a silicon grommet with a 1/16" inside diameter needle entry point 2158. This would permit a 22 gauge needle to enter the valve 1329. The height and width of the needle valve can also vary based upon the size of the canister 1426, fuel tray 130, water feed tray needle 682 and other components. For example, the needle valve 1329 shown in FIGS. 13A, 13B, 21A and 21B is a silicon grommet with a 5/16" height, extending 3/16" outside of the canister 1426. Similarly, the water distribution point 2157 can vary in size and specification as well. Water distribution point 2157 is where a reaction feed tube (not shown in FIGS. 21A and 21B) attaches to deliver water to the reactant fuel material to begin the reaction. Water distribution point 2157 can also vary in size and geometry such that water can travel straight through the needle valve (as shown in FIG. 21A and FIG. 21B) or can pass through at an angle (as shown in FIG. 13A and in FIG. 13C). For example, in FIG. 13C, the needle valve 1329 uses a grommet where the water 199 from the water feed tray 130 travels vertically into the canister while the water comes out of the grommet at a 90 degree angle into the canister 1426. The angled needle valve shown in FIG. 13C facilitates a low-profile canister design.

Figure 23A:
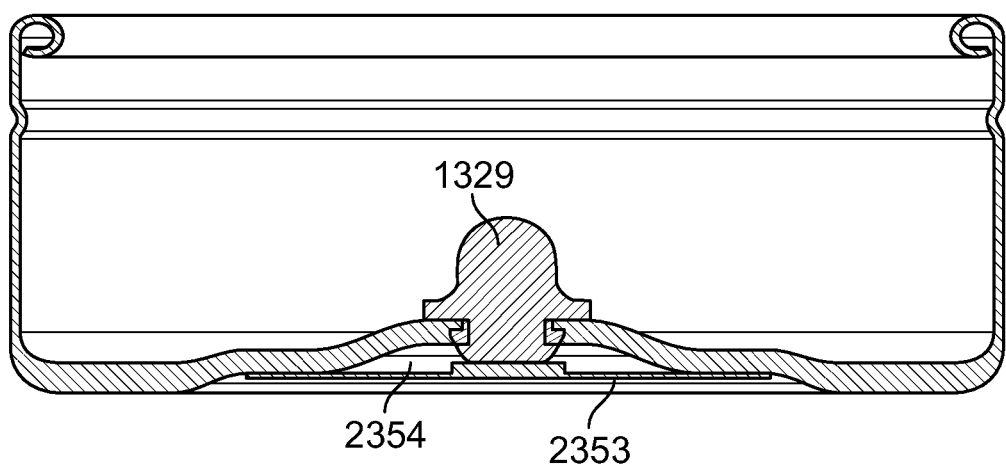
FIG. 23A shows a silicone sheet for fluid isolation a fuel cell system in accordance with the claimed invention.
Figure 23B:
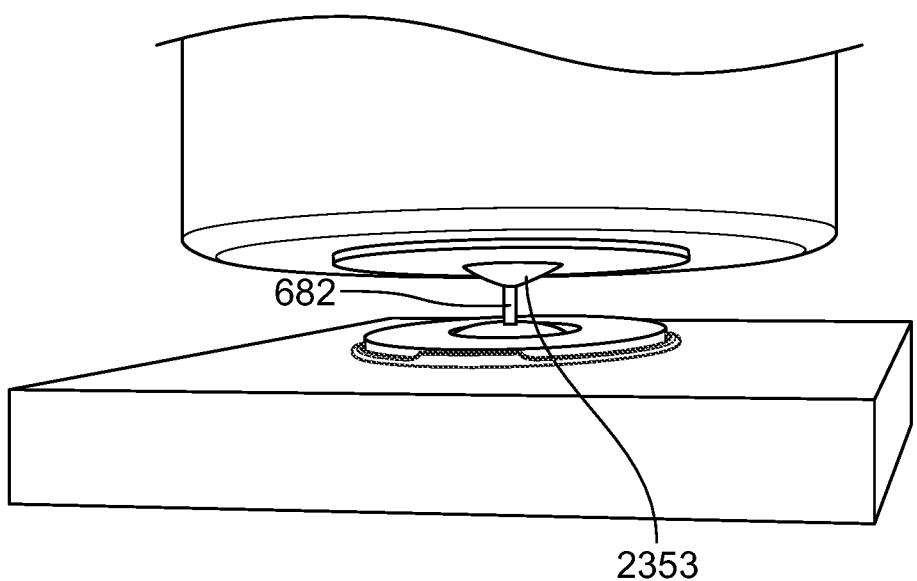
FIG. 23B shows a water feed tray needle and a silicone sheet providing fluid isolation in a fuel cell system in accordance with the claimed invention.
Figure 23C:
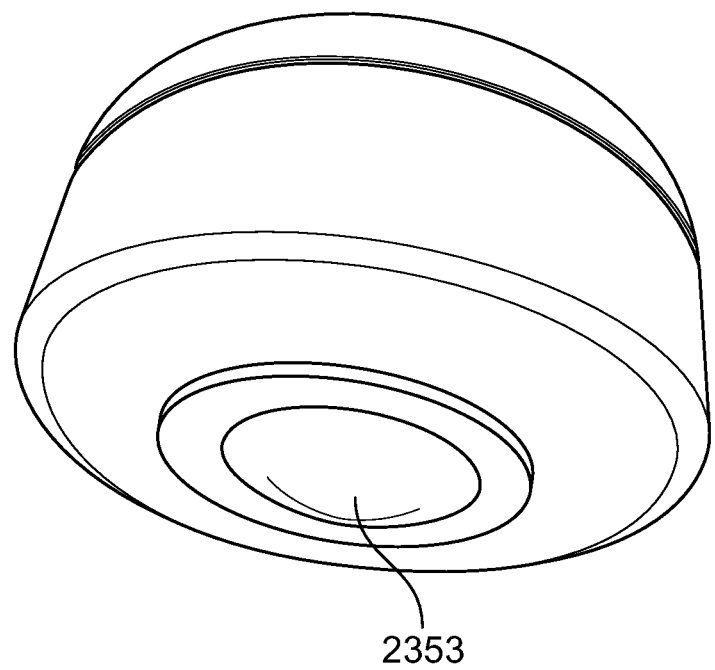
FIG. 23C shows a bottom view of a silicone sheet for fluid isolation in a fuel cell system in accordance with the claimed invention.

As shown further in FIG. 23A, for additional fluid isolation, a silicone sheet 2353 can be added on top of the needle valve 1329. Silicone sheet 2353 collects any liquid droplets off the edge of the water feed tray needle (not shown separately in FIG. 23). This additional measure of fluid isolation can serve to protect against liquids having a high pH, which could shed droplets. The water feed tray needle can, at times, have a droplet or a residual spray come out of it. The silicone sheet 2353 structure creates a void 2354 volume for the capture of any liquid upon removal of the water feed tray needle. An illustration of the water feed tray needle 682 being pulled out and stretching a silicone sheet 2353 and creating a void space is shown in FIG. 23B. A bottom view of the silicone sheet 2353 is shown in FIG. 23C. Additionally, a needle valve can be fabricated to perform both functions of the needle valve 1329 and silicone sheet 2353 in a single component.

As shown in FIG. 18A, the reaction feed tube 1883 is inserted inside the fuel cartridge and connected to the water distribution point 2157 to distribute of water 199 throughout the fuel cartridge 120. In one example implementation, silicone is used as the reaction feed tube 1882, and small holes 1884a, 1884b, 1884c are used for water dispersion. Small holes 1884a, 1884b, 1884c in rigid tubing may have a tendency to clog due to the byproducts of the reaction in the fuel cartridge 120. The holes 1884a, 1884b, 1884c can be precision-drilled, molded, or precision punched. In one example implementation, the holes in the silicone reaction feed tube 1883 will self-enlarge around blockages due to the flexibility of the tubing.

In one example implementation shown in FIG. 18B, a T-fitting 1884 can be used to connect the reaction feed tube 1883 to the water distribution point 2157. The T-fitting 1884 allows for rapid hand-assembly of the reaction feed tube 1883 and allows customization of the reaction feed tube and the delivery of the water to the reactant fuel material. As was the case with the reaction feed tube 1883 of FIG. 18A, similar silicone (or other flexible) tubing employing T-fitting 1884 can utilize a hole or a series of holes to control the uniformity, speed, and amount of water distributed by the reaction feed tube to the reactant fuel material. For example, holes can be fabricated in a wide range of different sizes and locations. The T-fitting 1884 allows for the use of silicone or other flexible tubing without custom molding. The T-fitting 1884 also allows for the tubing to stay in a controlled area. Without a T-fitting, the tubing of the reaction feed tube 1883 has a tendency to spring out towards to the walls of the canister 1426. If water is delivered to the reactant fuel material using this configuration, the water could pool in areas near the canister walls and not reach all of the reactant fuel material. The T-fitting allows for the tubing to be kept off the wall without the need of glue, other mechanical supports, or custom molded components and provides a uniform distribution of water to the reactant fuel material. However, these other supports can be used too.

Figure 14B:
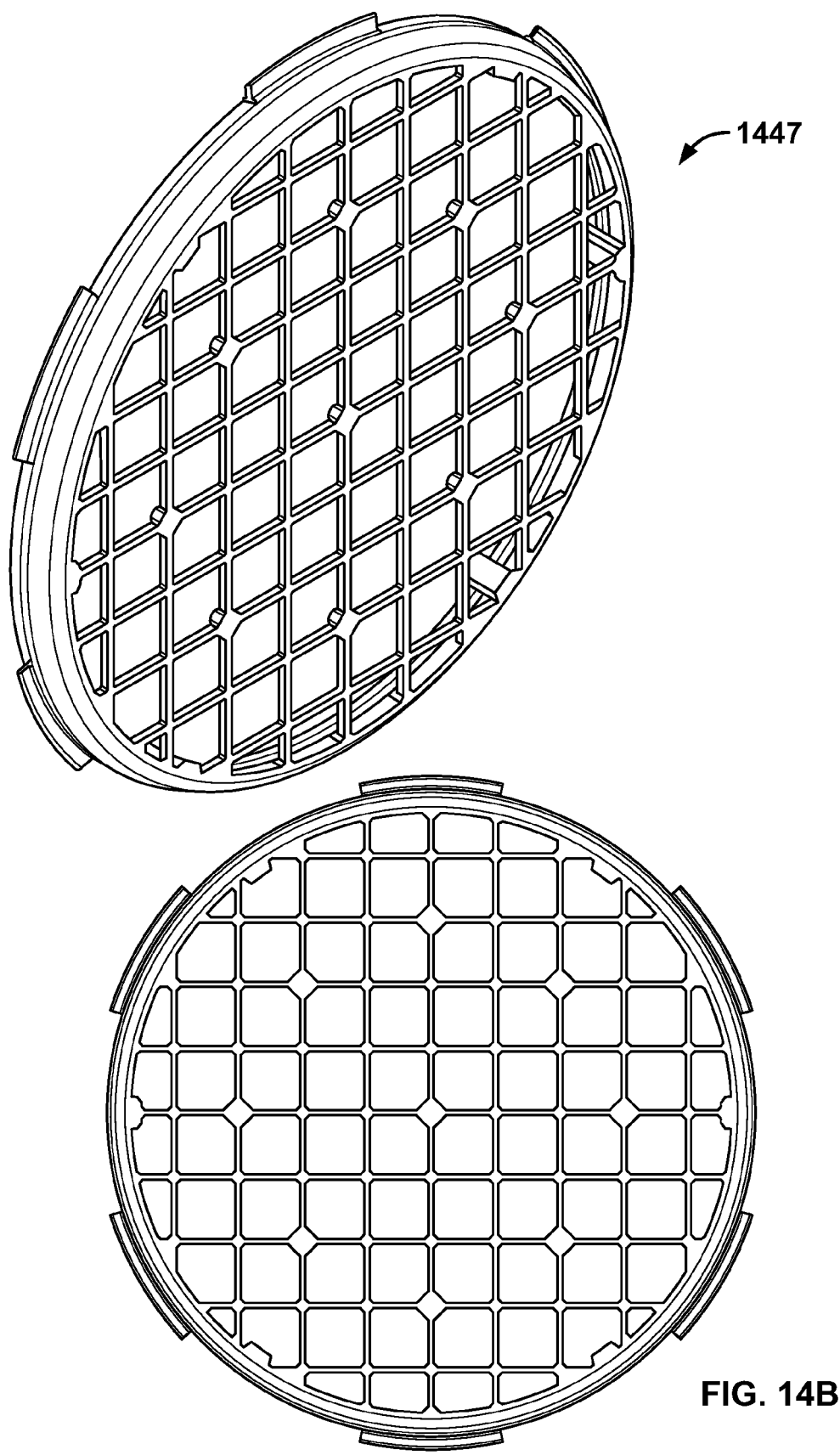
FIG. 14B illustrates a reactant retention screen for a fuel cartridge in accordance with the claimed invention.

As shown in FIG. 14B, in one example implementation a reactant retention screen 1447 can be implemented to prevent both reactant fuel material 177 from moving and/or clumping and to prevent the nucleation of high viscosity silicate bubbles. If the system 100 is operated while the fuel cartridge 120 is lying on its side or is upside down, the water feed tray 130 may not be adding water flow to the reactant fuel material 177. The retention screen 1447 keeps the powder in close proximity within the canister 1426. In one example, a molded retention screen 1447 can be fabricated with a diameter slightly larger than the inner diameter of the wall of the canister 1426. The retention screen 1447 can be pushed on top of the reactant fuel material 177 thereby consolidating the powder near the water distribution point of the fuel cartridge or under the water tubing 1883 (shown in FIGS. 18A and 18B) resulting in a uniform distribution of the reactant fuel material in proximity to the location of the water distribution. This configuration will provide a more uniform reaction than if the reactant fuel material were distributed in a non-uniform fashion throughout the canister 1426.

Additionally, as outlined above, in one example implementation, a water restriction orifice 1886 can be provided between the water distribution point 2157 and the reaction feed tube 1883. In another example, the water restriction orifice can be formed directly in the needle valve 1329 or directly in the reaction feed tube 1883. The water restriction orifice 1886 can be sized to limit the water flow to avoid excess water at start of the reaction or in case of a fuel cartridge breach. In the fuel cartridge breach, no hydrogen back pressure develops to counteract the spring pressure, which results in very high amounts of water delivered to the fuel cartridge, which in turns creates very high levels of hydrogen flow.

In a hydrogen "valve-less" configuration shown here, no traditional valve is used between the fuel cartridge and fuel cell. Hydrogen is generated when the fuel cell 110, fuel cartridge 120, and water feed tray 130 are connected, thereby eliminating the need for such a valve. Rather, as described above, a simple o-ring, face-seal, or other simple seal mechanism between the fuel cartridge and the filet cell are utilized without the need for a normally closed valve for the storage of gaseous hydrogen. The water-reactive fuel cell cartridge regulatory safety requirements require passing a water immersion test without significant (if any) hydrogen generation. A separator membrane can be used to keep water from back-diffusing through the hydrogen output orifice into the fuel cartridge materials that are water reactive. The cartridge valve is closed to prevent entry of water into the cartridge when it is not connected to the water feed tray and fuel cell.

Figure 15A:
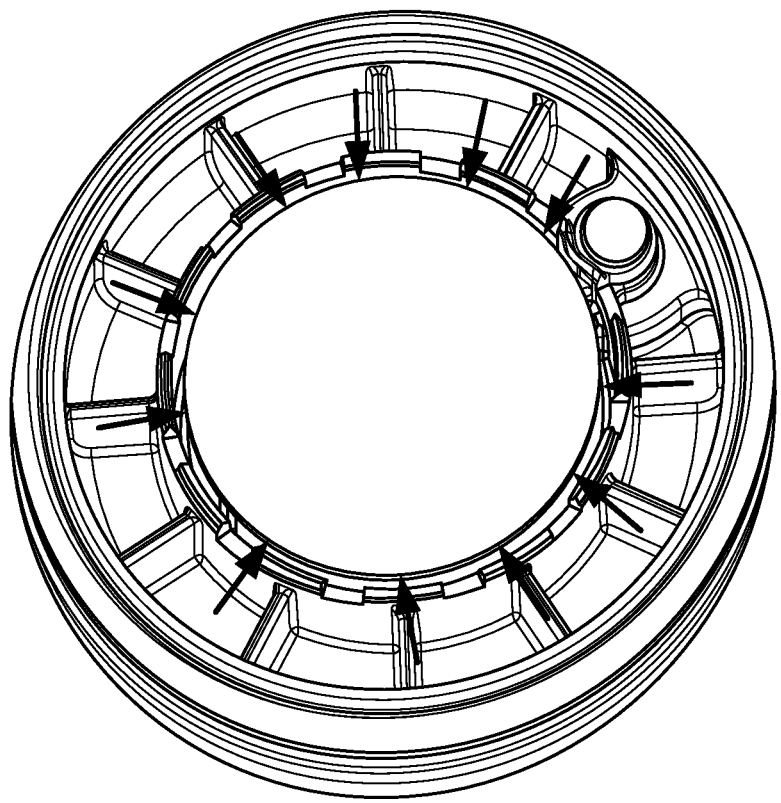
FIG. 15A shows a chemical scrubbing pathway for acquiring high purity hydrogen by controlling the exit flow over a filter bed integrally formed in a cap of a fuel cartridge in accordance with the claimed invention.
Figure 15B:
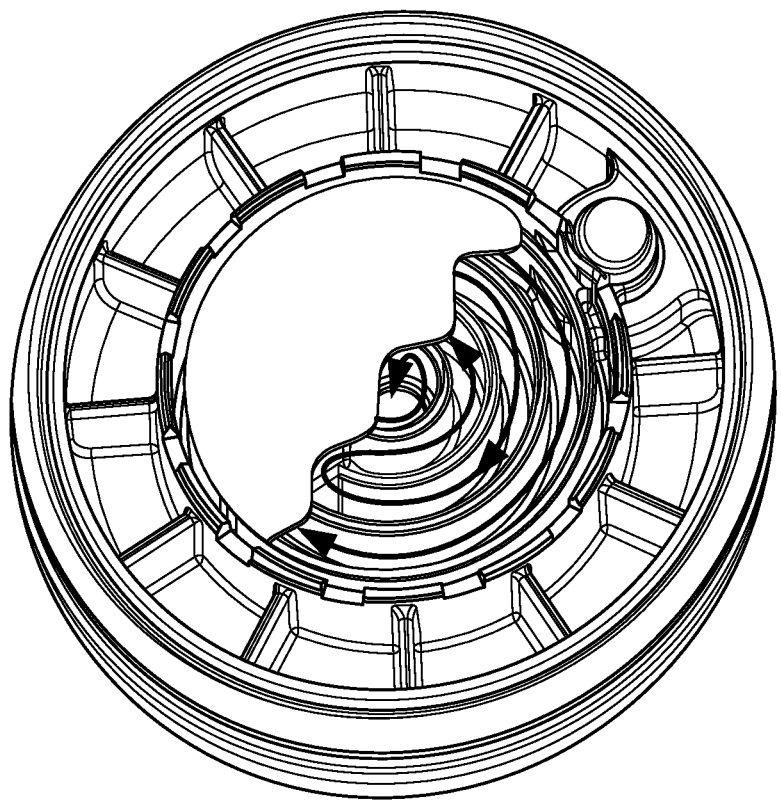
FIG. 15B shows a chemical scrubbing maze for acquiring high purity hydrogen by controlling the exit flow over a filter bed integrally formed in a cap of a fuel cartridge in accordance with the claimed invention.

For example, in one implementation, the hydrogen separator membrane can be heat-staked to the fuel cartridge cap. In one example implementation, the hydrogen separator membrane contains a scrubber to ensure hydrogen purity. As shown in FIGS. 15A and 15B, the cap can include hydrogen pathways (FIG. 15A) or a maze (FIG. 15B) inside the cap to provide additional separation and filtration capabilities. For example, CuO can be used. Additional scrubber materials can also be employed in the pathways depending upon the type and amount of potential contaminants that may be present. The scrubbers and separating membranes can be chosen to ensure that high purity hydrogen gas is delivered to the fuel cell. In one example implementation, a sheet is used between the scrubber and the membrane separator to provide a tong path-length over a filter bed.

Fuel cells typically operate on a given pressure where the hydrogen flow rate is determined by the electrical current output. As outlined above and in FIGS. 13A and 13B, the cartridge valve 1328 between the fuel cartridge 120 and the fuel cell 110 is a hydrogen orifice that can serve as a hydrogen flow restriction orifice. That is, a flow-restriction orifice in the top cap can be used to set or regulate the hydrogen flow (pressure) to the fuel cell. The developed hydrogen flow is determined by the hydrogen orifice size and the developed hydrogen pressure, which is determined by the delivered water pressure (to the reactant fuel material). In the claimed invention, the fuel cell dynamically adjusts to the developed hydrogen flow. The fuel cell increases fuel consumption if hydrogen is available and decreases consumption if not available by charging or discharging a battery (in the fuel cell) at a constant load. The cartridge valve (hydrogen orifice) and the pressure developed by the water feed system spring are used to set the hydrogen flow to an optimal flow range which enables the fuel cell to operate at a predictable current. In this fashion, the hydrogen fuel cell of the claimed invention is analogous to an electrical current-source, as opposed to previous systems where hydrogen fuel cells were typically analogous to electrical voltage sources. Alternatively, the hydrogen orifice can be used to simply set a maximum flow and the cartridge will self-regulate flow below the maximum level as determined by the developed pressure and orifice size. If a fuel cell consumes less than the maximum level and contains a valve to build up internal fuel cell pressure (as is common with fuel cell systems), the fuel cartridge will self regulate and maintain a nominal constant pressure and only generate the amount of hydrogen required by the fuel cell.

As outlined above, the fuel cartridge can utilize sodium silicide powder as the reactant fuel material. For example, a 30 g fuel cartridge can include 4 g of sodium silicide powder. Approximately 10 ml of water is mixed with this energy-carrying reactant fuel material to produce approximately 4 liters of hydrogen gas, resulting in an energy output from the fuel cell of approximately 4 watt hours. The fuel cartridge is water-proof, has a minimum shelf life of two years, can be stored at temperatures of up to 70° C., and can be used in operating temperatures between approximately 0° C. to 40° C. to generate hydrogen gas to be used in fuel cell 110.

Fuel Cell

As outlined above, the claimed system incorporates a water-reactive fuel cell that utilizes a reactant fuel material, such as sodium silicide, for example, and water to generate hydrogen. One example fuel cell in accordance with the claimed invention includes a 4 Polymer Electrolyte Membrane (PEM) 1000 mAh cell fuel cell stack rated for a 5V, 500 mA input and a 5V, 1000 mA output. One example fuel cell in accordance with the claimed invention includes a Li-ion 1600 mAh internal buffer and utilizes a micro USB charging input port and a USB-A charging output port.

An example fuel cell in accordance with the claimed invention has a rated input (micro USE charging of the internal battery) of 2.5 W and a rated total output of 2.5 W (fuel cell mode) and 5.0 W (internal buffer/battery mode). One example fuel cell in accordance with the claimed invention includes an internal buffer (battery) capacity of 5.9 Wh (1600 mAh, 3.7 V). One example fuel cell in accordance with the claimed invention is compact and portable with approximate dimensions of 66 mm (width)×128 mm (length)×42 mm (height) and weighs approximately 175 g (without water feed tray) and approximately 240 g (with the water feed tray).

Having thus described the basic concept of the invention, it will be rather apparent to those skilled in the art that the foregoing detailed disclosure is intended to be presented by way of example only, and is not limiting. In addition to the embodiments and implementations described above, the invention also relates to the individual components and methods, as well as various combinations and subcombinations within them. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as can be specified in the claims. Accordingly, the invention is limited only by the following claims and equivalents thereto.

The claimed invention is:

1. A hydrogen fuel cell system comprising:
    a fuel cell;
    a fuel cartridge including a reactant fuel material; and
    a water feed tray operably connected to the fuel cartridge and configured to provide an aqueous solution into the fuel cartridge to react with the reactant fuel material to develop hydrogen for the fuel cell,
    wherein said water feed tray includes a spring mechanism operably connected to the water feed tray and configured to push the fuel cartridge against the fuel cell providing the force required for a hydrogen seal during operation of the system.

2. The hydrogen fuel cell system of claim 1, wherein the reactant fuel material includes a stabilized alkali metal.

3. The hydrogen fuel cell system of claim 2, wherein the stabilized alkali metal includes sodium silicide or sodium silica gel, and optionally a coreactant.

4. The hydrogen fuel cell system of claim 1, wherein the aqueous solution includes water.

5. The hydrogen fuel cell system of claim 1, wherein the water feed tray includes a spring assembly configured to pressurize the aqueous solution in the water feed tray.

6. The hydrogen fuel cell system of claim 1, wherein the water feed tray includes an access door configured to receive the aqueous solution.

7. The hydrogen fuel cell system of claim 6, wherein the access door of the water feed tray includes a latching shelf configured to position the access door in a locked open position for receiving the aqueous solution.

8. The hydrogen fuel cell system of claim 7, wherein the water feed tray includes a spring assembly configured to pressurize the aqueous solution in the water feed tray.

9. The hydrogen fuel cell system of claim 8, wherein the latching shelf is further configured to load the spring assembly when the access door is positioned in the locked open position.

10. The hydrogen fuel cell system of claim 8, wherein the access door includes an unlocking mechanism and is configured to unlock and activate the spring assembly to impart a force on the aqueous solution in the water feed tray.

11. The hydrogen fuel cell system of claim 5, wherein the water feed tray includes a normally closed valve configured as a check valve to regulate pressure of the pressurized aqueous solution delivered to the fuel cartridge.

12. The hydrogen fuel cell system of claim 11, wherein the check valve and spring assembly are further configured to provide a controlled flow of aqueous solution to the fuel cartridge.

13. The hydrogen fuel cell system of claim 1, wherein the water feed tray includes a normally closed valve configured to prevent the aqueous solution from traveling to the fuel cartridge when the fuel cartridge and the fuel cell are not connected to the water feed tray and further configured to open when the fuel cell and the fuel cartridge are connected to the water feed tray.

14. The hydrogen fuel cell system of claim 1, wherein the spring mechanism is further configured to eject the fuel cartridge from a water feed connection when the fuel cell is disconnected from the system.

15. The hydrogen fuel cell system of claim 1, wherein the water feed tray includes a latch locking point configured to receive a latch from the fuel cell and further configured to push the fuel cartridge against the fuel cell providing an engagement force for a hydrogen seal between the fuel cartridge and the fuel cell during operation of the system.

16. The hydrogen fuel cell system of claim 1, wherein the water feed tray includes a water tray needle configured to deliver the aqueous solution to the fuel cartridge.

17. The hydrogen fuel cell system of claim 1, wherein the water feed tray includes a bellows assembly configured to hold the aqueous solution.

18. The hydrogen fuel cell system of claim 17, wherein the bellows assembly includes a spring configured inside the bellows assembly.

19. The hydrogen fuel cell system of claim 18, wherein the spring is further configured to pressurize the aqueous solution when the bellows assembly is collapsing.

20. The hydrogen fuel cell system of claim 19, wherein the spring is further configured to pressurize the aqueous solution when the bellows assembly is fully collapsed.

21. The hydrogen fuel cell system of claim 1, wherein the fuel cartridge includes a defoamer.

22. The hydrogen fuel cell system of claim 1, wherein the fuel cartridge includes a surfactant to break down surface tension of reaction by-products in the fuel cartridge.

23. The hydrogen fuel cell system of claim 22, wherein the reaction by-products in the fuel cartridge include sodium silicate.

24. The hydrogen fuel cell system of claim 1, wherein the fuel cartridge includes a cartridge valve configured to control hydrogen flow from the fuel cartridge to the fuel cell.

25. The hydrogen fuel cell system of claim 1, wherein the fuel cartridge includes a needle valve configured to pass aqueous solution from the water tray feed to the fuel cartridge.

26. The hydrogen fuel cell system of claim 1, wherein the fuel cartridge includes a reaction feed tube configured to disperse the aqueous solution to the reactant fuel material.

27. The hydrogen fuel cell system of claim 26, wherein the reaction feed tube includes a T-fitting configured to uniformly disperse the aqueous solution to the reactant fuel material.

28. The hydrogen fuel cell system of claim 1, wherein the fuel cartridge includes a reactant retention screen configured to contain the reactant fuel material in the fuel cartridge.

29. The hydrogen fuel cell system of claim 1, wherein the fuel cartridge includes a hydrogen separator membrane configured to filter hydrogen gas produced in the fuel cartridge.

30. The hydrogen fuel cell system of claim 1, wherein the fuel cartridge does not store hydrogen gas when disconnected from the fuel cell.

31. The hydrogen fuel cell system of claim 30, wherein the fuel cartridge is waterproof and configured so as to not generate hydrogen when the fuel cartridge is immersed in water.

32. The hydrogen fuel cell system of claim 1, wherein the fuel cartridge includes a top cap operably connected to a canister body to provide reusable fuel cartridge components.

33. The hydrogen fuel cell system of claim 1, wherein the fuel cartridge and the water feed tray are further configured to provide a controlled flow of hydrogen to the fuel cell by the configuration of a check valve in the water feed tray, a spring assembly in the water feed tray, and a cartridge valve in the fuel cartridge.

34. The hydrogen fuel cell system of claim 1, wherein the fuel cartridge includes a roll-over crimp to join a metal canister and a plastic cap.

\* \* \* \* \*